US008090100B2

(12) United States Patent
Kito et al.

(10) Patent No.: US 8,090,100 B2
(45) Date of Patent: Jan. 3, 2012

(54) STORAGE APPARATUS AND DATA MANAGEMENT METHOD FOR CHANGING KEYS OF A LOGICAL VOLUME AND COMMON RESOURCE

(75) Inventors: Daisuke Kito, Machida (JP); Kenji Fujii, Yokohama (JP); Manabu Kitamura, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 927 days.

(21) Appl. No.: 12/016,355

(22) Filed: Jan. 18, 2008

(65) Prior Publication Data

US 2008/0240429 A1 Oct. 2, 2008

(30) Foreign Application Priority Data

Mar. 27, 2007 (JP) ................. 2007-081194

(51) Int. Cl.
| | |
|---|---|
| H04L 9/00 | (2006.01) |
| H04L 29/06 | (2006.01) |
| G06F 11/30 | (2006.01) |
| G06F 12/14 | (2006.01) |
| G06F 9/00 | (2006.01) |
| G06F 9/24 | (2006.01) |
| G06F 1/24 | (2006.01) |
| G11C 7/00 | (2006.01) |
| G06F 7/04 | (2006.01) |
| G06F 17/30 | (2006.01) |
| H04N 7/16 | (2011.01) |

(52) U.S. Cl. ............ 380/45; 380/30; 713/165; 713/190; 713/1; 713/100; 713/193; 726/27; 726/16

(58) Field of Classification Search .................. 713/165; 380/45

See application file for complete search history.

(56) References Cited

U.S. PATENT DOCUMENTS

| 7,111,026 | B2 | 9/2006 | Sato et al. | |
|---|---|---|---|---|
| 7,178,036 | B1 * | 2/2007 | Staring et al. | 713/193 |
| 7,225,341 | B2 * | 5/2007 | Yoshino et al. | 713/193 |
| 7,272,228 | B2 * | 9/2007 | Atkin et al. | 380/264 |
| 7,320,008 | B1 * | 1/2008 | Colgrove | 1/1 |

(Continued)

FOREIGN PATENT DOCUMENTS

JP 2005-165441 A 6/2005

(Continued)

OTHER PUBLICATIONS

Japanese Office Action corresponding to Japanese Patent Application No. Q101817, dated Aug. 2, 2011.

Primary Examiner — Nathan Flynn
Assistant Examiner — Carolyn B Kosowski
(74) Attorney, Agent, or Firm — Sughrue Mion, PLLC

(57) ABSTRACT

A storage apparatus, which controls the input and output of data to and from a computer, includes a logical volume for storing data from the computer, a common resource for storing data pre-stored in the logical volume as update data in order to store subsequent data from the computer in the logical volume, an encryption/decryption unit for encrypting or decrypting data stored in the logical volume or update data stored in the common resource, and a key change unit for changing a key for encrypting or decrypting data stored in the logical volume. The storage apparatus changes the key for encrypting or decrypting update data stored in the common resource based on information of the key used for data stored in the logical volume.

23 Claims, 23 Drawing Sheets

U.S. PATENT DOCUMENTS

| | | | |
|---|---|---|---|
| 7,337,313 B2 * | 2/2008 | Kumagai | 713/100 |
| 7,434,069 B2 * | 10/2008 | Nessler | 713/193 |
| 7,627,756 B2 * | 12/2009 | Fujibayashi et al. | 713/165 |
| 7,752,457 B2 * | 7/2010 | Yagawa | 713/189 |
| 2003/0037247 A1 * | 2/2003 | Obara et al. | 713/193 |
| 2005/0120171 A1 | 6/2005 | Yasukawa et al. | |
| 2006/0085636 A1 * | 4/2006 | Osaki | 713/165 |
| 2006/0218406 A1 * | 9/2006 | Kinoshita et al. | 713/182 |
| 2006/0242431 A1 * | 10/2006 | LeCrone et al. | 713/193 |
| 2007/0136606 A1 * | 6/2007 | Mizuno | 713/189 |
| 2008/0034226 A1 * | 2/2008 | Maruyama et al. | 713/193 |
| 2008/0155276 A1 * | 6/2008 | Chen et al. | 713/193 |
| 2008/0229118 A1 * | 9/2008 | Kasako et al. | 713/193 |
| 2008/0240434 A1 * | 10/2008 | Kitamura | 380/255 |
| 2010/0042832 A1 * | 2/2010 | Fujibayashi et al. | 713/165 |

FOREIGN PATENT DOCUMENTS

| | | |
|---|---|---|
| JP | 2005-235058 A | 9/2005 |
| JP | 200728502 A | 2/2007 |

* cited by examiner

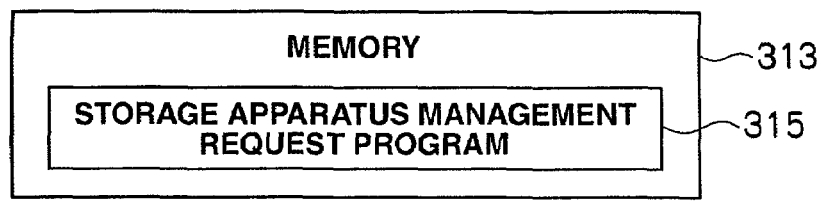
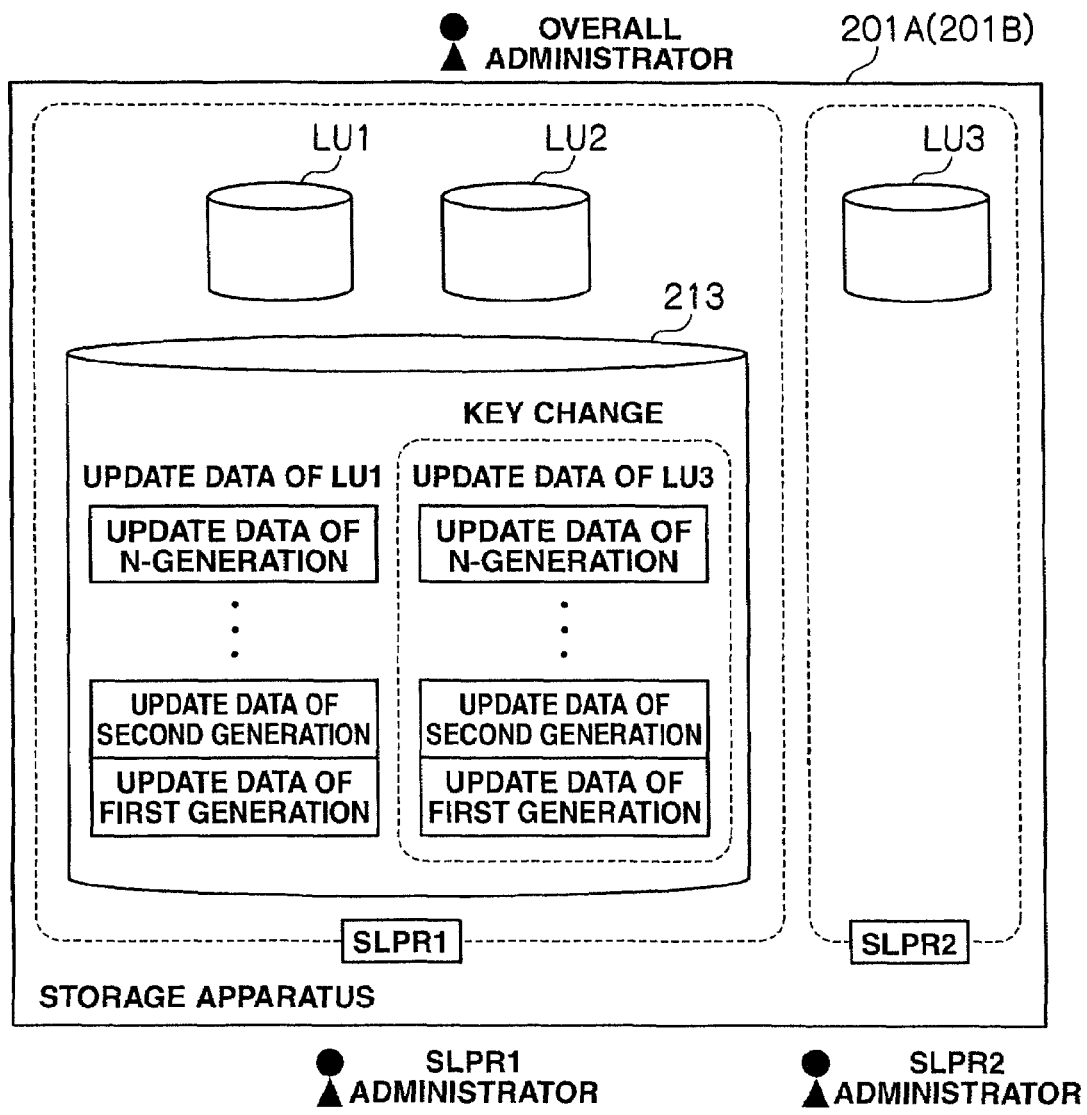

FIG.5

PHYSICAL DISK MANAGEMENT INFORMATION 243

| DISK NUMBER | CAPACITY | RAID | RAID GROUP NUMBER |
|---|---|---|---|
| 001 | 100GB | 5 | 0 |
| 002 | 100GB | 5 | 0 |
| 003 | 100GB | 5 | 0 |
| 004 | 100GB | 5 | 0 |
| 005 | 100GB | 5 | 0 |
| 006 | 200GB | 1 | 1 |
| ⋮ | ⋮ | ⋮ | ⋮ |

FIG.6

LU MANAGEMENT INFORMATION 244

| LU NUMBER | DISK NUMBER | CAPACITY | RAID | AFFILIATED SLPR | COMMON RESOURCE FLAG | CHANGE STATUS |
|---|---|---|---|---|---|---|
| 1 | 001, 002, 003, 004, 005 | 100GB | 5 | 1 | ON | |
| 2 | 001, 002, 003, 004, 005 | 100GB | 5 | 1 | OFF | |
| 3 | 006, 007 | 200GB | 1 | 2 | ON | CHANGING (BLOCK NUMBER 10) |
| ⋮ | ⋮ | ⋮ | ⋮ | ⋮ | ⋮ | ⋮ |

FIG.9

246 KEY CHANGE INFORMATION

| LU NUMBER (246A) | KEY (BEFORE CHANGE) (246B) || KEY (AFTER CHANGE) (246C) || CHANGE STATUS (246D) |
|---|---|---|---|---|---|
| | KEY NUMBER (246B1) | KEY DATA (246B2) | KEY NUMBER (246C1) | KEY DATA (246C2) | |
| 1, 2 | 1 | lxyeiuaoiuo... | | | |
| 3 | 1 | lxyeiuaoiuo... | 2 | 3worrglk87... | CHANGING |
| ⋮ | ⋮ | ⋮ | ⋮ | ⋮ | ⋮ |

FIG.10

247 COMMON RESOURCE INTERNAL DATA MANAGEMENT INFORMATION

| COMMON RESOURCE NUMBER (247A) | SLPR NUMBER (247B) | LU NUMBER (247C) | SLPR NUMBER (247D) | CHANGE STATUS (247E) |
|---|---|---|---|---|
| 1 | 1 | 1 | 1 | |
| | | 3 | 2 | CHANGING (BLOCK NUMBER 5) |
| ⋮ | ⋮ | ⋮ | ⋮ | ⋮ |

FIG.11

248
ACCOUNT INFORMATION

| 248A | 248B | 248C |
|---|---|---|
| USER ID | PASSWORD | ROLE |
| 00001 | ***** | OVERALL ADMINISTRATOR |
| 0xlaa | ***** | SLPR1 ADMINISTRATOR |
| 1234 | ***** | SLPR2 ADMINISTRATOR |
| ⋮ | ⋮ | ⋮ |

FIG.12

249
ROLE-DEFINITION INFORMATION

| 249A | 249B | 249C |
|---|---|---|
| ROLE NAME | SLPR | KEY |
| OVERALL ADMINISTRATOR | ALL | ALL |
| SLPR1 ADMINISTRATOR | 1 | KEY OF SLPR1 |
| SLPR2 ADMINISTRATOR | 2 | KEY OF SLPR2 |
| ⋮ | ⋮ | ⋮ |

| | KEY INFORMATION | | |
|---|---|---|---|
| 245A | 245B | 245C | 245D |
| SLPR NUMBER | KEY NUMBER | KEY DATA | KEY CHANGE |
| - | 1 | lxyeiuaoiuo... | |

| | KEY INFORMATION | | |
|---|---|---|---|
| 245A | 245B | 245C | 245D |
| SLPR NUMBER | KEY NUMBER | KEY DATA | KEY CHANGE |
| 1 | 1 | lxyeiuaoiuo... | |
| 2 | 2 | 3worrglk87... | CHANGING |

| | KEY INFORMATION | | |
|---|---|---|---|
| 245A | 245B | 245C | 245D |
| SLPR NUMBER | KEY NUMBER | KEY DATA | KEY CHANGE |
| 1 | 1 | lxyeiuaoiuo... | |
| 2 | 2 | 3worrglk87... | |

FIG.18A

COMMON RESOURCE INTERNAL DATA MANAGEMENT INFORMATION (247)

| COMMON RESOURCE NUMBER (247A) | SLPR NUMBER (247B) | LU NUMBER (247C) | SLPR NUMBER (247D) | CHANGE STATUS (247E) |
|---|---|---|---|---|
| 1 | - | 1 | - | |
| | | 3 | - | |
| ⋮ | ⋮ | ⋮ | ⋮ | ⋮ |

FIG.18B

COMMON RESOURCE INTERNAL DATA MANAGEMENT INFORMATION (247)

| COMMON RESOURCE NUMBER (247A) | SLPR NUMBER (247B) | LU NUMBER (247C) | SLPR NUMBER (247D) | CHANGE STATUS (247E) |
|---|---|---|---|---|
| 1 | 1 | 1 | 1 | |
| | | 3 | 2 | CHANGING (BLOCK NUMBER 5) |
| ⋮ | ⋮ | ⋮ | ⋮ | ⋮ |

FIG.18C

COMMON RESOURCE INTERNAL DATA MANAGEMENT INFORMATION (247)

| COMMON RESOURCE NUMBER (247A) | SLPR NUMBER (247B) | LU NUMBER (247C) | SLPR NUMBER (247D) | CHANGE STATUS (247E) |
|---|---|---|---|---|
| 1 | 1 | 1 | 1 | |
| | | 3 | 2 | |
| ⋮ | ⋮ | ⋮ | ⋮ | ⋮ |

| | KEY INFORMATION | | |
|---|---|---|---|
| 245A | 245B | 245C | 245D |
| SLPR NUMBER | KEY NUMBER | KEY DATA | KEY CHANGE |
| 1 | 2 | diqweij34w... | |
| 2 | 3 | fl0gf8dkeoi... | |

| | KEY INFORMATION | | |
|---|---|---|---|
| 245A | 245B | 245C | 245D |
| SLPR NUMBER | KEY NUMBER | KEY DATA | KEY CHANGE |
| - | 4 | sddji93jdfu... | |

FIG.25

STORAGE APPARATUS (201C)

SLPR1 — contains LU1, LU2, and 213A
- LU1
- LU2
- 213A: UPDATE DATA OF LU1 (UPDATE DATA OF N-GENERATION ... UPDATE DATA OF SECOND GENERATION, UPDATE DATA OF FIRST GENERATION)
- UPDATE DATA OF LU3 (UPDATE DATA OF N-GENERATION ... UPDATE DATA OF SECOND GENERATION, UPDATE DATA OF FIRST GENERATION)

KEY CHANGE/MIGRATION ⇒

SLPR2 — contains LU3 and 213B
- LU3
- 213B: UPDATE DATA OF LU3 (UPDATE DATA OF N-GENERATION ... UPDATE DATA OF SECOND GENERATION, UPDATE DATA OF FIRST GENERATION)

● OVERALL ADMINISTRATOR
● SLPR1 ADMINISTRATOR
● SLPR2 ADMINISTRATOR

FIG.28A

COMMON RESOURCE INTERNAL DATA MANAGEMENT INFORMATION (247)

| COMMON RESOURCE NUMBER (247A) | SLPR NUMBER (247B) | LU NUMBER (247C) | SLPR NUMBER (247D) | CHANGE STATUS (247E) |
|---|---|---|---|---|
| 1 | - | 1 | - | |
| | | 3 | - | |
| ⋮ | ⋮ | ⋮ | ⋮ | ⋮ |

FIG.28B

COMMON RESOURCE INTERNAL DATA MANAGEMENT INFORMATION (247)

| COMMON RESOURCE NUMBER (247A) | SLPR NUMBER (247B) | LU NUMBER (247C) | SLPR NUMBER (247D) | CHANGE STATUS (247E) |
|---|---|---|---|---|
| 1 | 1 | 1 | 1 | |
| | | 3 | 2 | CHANGING (BLOCK NUMBER 5) |
| ⋮ | ⋮ | ⋮ | ⋮ | ⋮ |

FIG.28C

COMMON RESOURCE INTERNAL DATA MANAGEMENT INFORMATION (247)

| COMMON RESOURCE NUMBER (247A) | SLPR NUMBER (247B) | LU NUMBER (247C) | SLPR NUMBER (247D) | CHANGE STATUS (247E) |
|---|---|---|---|---|
| 1 | 1 | 1 | 1 | |
| 2 | 2 | 3 | 2 | |
| ⋮ | ⋮ | ⋮ | ⋮ | ⋮ |

STORAGE APPARATUS AND DATA MANAGEMENT METHOD FOR CHANGING KEYS OF A LOGICAL VOLUME AND COMMON RESOURCE

CROSS REFERENCES

This application relates to and claims priority from Japanese Patent Application No. 2007-081194, filed on Mar. 27, 2007, the entire disclosure of which is incorporated herein by reference.

BACKGROUND

The present invention generally relates to a storage apparatus and a data management method, and in particular relates to technology for encrypting or decrypting a common resource provided by the storage apparatus.

Pursuant to the enlargement of computer systems, a storage area network of connecting a storage apparatus with another storage apparatus, or connecting a storage apparatus with a computer using a network exclusive to the storage apparatus such as a fibre channel is becoming widely used. With the foregoing computer systems, various technologies are being developed for efficiently managing the enormous quantity of data or improving the availability of data.

For instance, there is technology in which, by partitioning one storage apparatus into a plurality of logical storage resources (hereinafter referred to as SLPR: Storage management logical partition) and providing such logical storage resources to a user, a computer or a management computer will recognize each SLPR as a physically different storage apparatus (for instance, refer to Japanese Patent Laid-Open Publication No. 2005-165441; "Patent Document 1"). Specifically, Patent Document 1 describes technology of allocating resources such as a plurality of storage areas or a plurality of ports of the storage apparatus to each SLPR. According to this technology, for instance, by allocating the SLPR to each business division of a company, it will be possible to manage the computer system independently for each business division.

As another technology, there is technology known as a snapshot or CDP (Continuous Data Protection) for reconstructing data of a storage area to a status at an arbitrary point in time (for instance, refer to Japanese Patent Laid-Open Publication No. 2005-235058; "Patent Document 2"). A snapshot is a data image of a storage area at a certain designated time. Patent Document 2 uses a common resource similar to a common journal volume to be used for reconstructing data between a plurality of storage areas. A common resource is a storage area configured from one or more storage areas. Upon updating the data stored in a storage area, the data pre-stored in the storage area, which is overwritten by this updating, is stored as update data in the common resource. The common resource stores update data (update data of a generation) divided at each arbitrary point in time. The update data is used when it becomes necessary to reconstruct the data in the storage area. For instance, an administrator is able to reconstruct data at an arbitrary point in time by acquiring the update data stored in the common resource up to the point in time such administrator wishes to reconstruct the data and restoring it to a prescribed snapshot.

As additional technology, there is technology for encrypting the data stored in a storage area in order to improve the security of the computer system. According to this technology, it is possible to prevent unauthorized access to data and prevent the divulgence of data when a disk is stolen.

SUMMARY

With the foregoing technologies, although it is possible to logically partition resources such as storage areas and ports of the storage apparatus and allocate such resources to each SLPR, no consideration is given to logically partitioning the update data stored in the common resource.

Further, when the configuration of a storage area using the common resource is changed as a result of the storage apparatus being logically partitioned; for instance, when the SLPR to which a certain storage area is affiliated is changed, it is necessary to reflect the change in the configuration of the storage area to the update data in the common resource, but the technologies described above do not give any consideration to such a method.

Thus, when logically partitioning a storage apparatus that encrypts stored data, the following problems will arise.

Foremost, the first problem entails the following issues.

Considered is a case where, before logically partitioning a storage apparatus, all storage areas in the storage apparatus are encrypted with a single encryption key. And after logically partitioning the storage apparatus, a different administrator is appointed for each SLPR to manage such SLPR independently. In this case, each administrator must not know the encryption key to be used for the SLPR other than the SLPR that it is personally managing, and the storage areas may be encrypted with a different encryption key for each SLPR.

However, even assuming that the storage areas are encrypted with a different encryption key for each SLPR, no consideration is given to logically partitioning the update data in the common resource as described above. Thus, the update data in the common resource remains encrypted with a single encryption key.

In other words, when logically partitioning a storage apparatus, even in a case where each update data of the storage area affiliated with a different SLPR is stored in one common resource, the update data in the common resource will not be encrypted with a different encryption key for each SLPR. Accordingly, there is a problem in that the update data in the common resource will merely be encrypted with a single encryption key that is used in the SLPR to which one common resource is affiliated.

The second problem entails the following issues.

For instance, considered is a case where, by logically partitioning a storage apparatus, the storage apparatus is logically partitioned into a first SLPR and a second SLPR, and the common resource is affiliated with the first SLPR. Further, let it be assumed that update data of the storage area in the first SLPR and update data of the storage area in the second SLPR coexist in the common resource. Finally, let it be assumed that administrator A is managing the first SLPR and administrator B is managing the second SLPR.

In the foregoing case, when the encryption key of the first SLPR managed by administrator A is divulged due to an error on the part of administrator A, not only will the data in the first SLPR be divulged, there is a problem in that the data (update data of the storage area affiliated with the second SLPR stored in the common resource) in the second SLPR of administrator B, who is operating and managing the computer system independently from administrator A and who did not commit an error of divulging the encryption key, will also be divulged.

In addition, the foregoing problem is not limited to cases when changing the encryption key to be used upon logically partitioning or logically connecting the storage apparatus and changing the administrator to manage such encryption key, and this problem will also arise in cases of changing the encryption key of the storage area using the common resource and changing the administrator to manage such encryption key.

The third problem entails the following issues.

For example, considered is a case where, without encrypting the common resource itself, the update data encrypted with an encryption key of each storage area using the common resource is stored in such common resource in order to prevent the second problem described above. In the foregoing case, each update data of the storage area encrypted with a different encryption key for each SLPR (or for each storage area) will be stored in the common resource. Nevertheless, as a result of changing the encryption key of the storage area, there is a possibility that the update data of the storage area after the encryption key was changed and the update data of the storage area before the encryption key was changed will coexist in the common resource.

In the foregoing case, when restoring the update data of the storage area after the encryption key was changed to the update data of the storage area before the encryption key was changed, or when restoring the update data of the storage area before the encryption key was changed to the update data of the storage area after the encryption key was changed, there is a problem in that data cannot be reconstructed properly, and such data may be destroyed.

The foregoing problem is not limited to cases when changing the encryption key to be used upon logically partitioning or logically connecting the storage apparatus and changing the administrator to manage such encryption key, and this problem will also arise in cases when changing the encryption key upon updating (re-key) the encryption key to be used for the storage area.

The present invention was made in view of the foregoing problems. Thus, an object of the present invention is to provide a storage apparatus and a data management method capable of increasing the security of update data to be stored in a common resource and simultaneously enabling an administrator to properly access the update data in the common resource even when the encryption key to be used for the storage area is changed or when the administrator is changed upon logically partitioning or connecting the storage apparatus.

In order to achieve the foregoing object, the present invention provides a storage apparatus that controls the input and output of data to and from a computer. This storage apparatus includes a logical volume for storing data from the computer, a common resource for storing data pre-stored in the logical volume as update data in order to store subsequent data from the computer in the logical volume, an encryption/decryption unit for encrypting or decrypting data stored in the logical volume or update data stored in the common resource, and a key change unit for changing a key for encrypting or decrypting data stored in the logical volume, and changing a key for encrypting or decrypting update data stored in the common resource based on information of the key used for data stored in the logical volume.

Thereby, when a key to be used for the logical volume is changed, the storage apparatus will also be able to change the key to be used for the storage area in the common resource storing the update data of data stored in the logical volume.

The present invention further provides a data management method of a storage apparatus connected to a computer. This data management method comprises an encryption/decryption step for storing data from the computer, storing data pre-stored in the logical volume as update data in order to store subsequent data from the computer in the logical volume, and encrypting or decrypting data stored in the logical volume or update data stored in the common resource; and a key change step for changing a key for encrypting or decrypting data stored in the logical volume, and changing a key for encrypting or decrypting update data stored in the common resource based on information of the key used for data stored in the logical volume.

Thereby, when a key to be used for the logical volume is changed, the storage apparatus will also be able to change the key to be used for the storage area in the common resource storing the update data of data stored in the logical volume.

In addition, the storage apparatus receives a logical partition/logical connection request of the self storage apparatus from a management computer, and logically partitions or logically connects the self storage apparatus. The storage apparatus creates a new key upon logically partitioning or logically connecting the self storage apparatus, and changes the key to be used for the SLPR. The storage apparatus confirms whether the storage area to undergo a key change pursuant to the key change of the SLPR is using the common resource. When the storage area is using the common resource, the update data of the storage area in the common resource is decrypted with a key before the key change, and re-encrypted with the new key after the key change. Further, when the storage apparatus receives a write request from the computer for writing data in a storage area that is undergoing a key change among the storage areas using the common resource, it confirms the key change status of the location to where data is to be written. According to the key change status, the storage apparatus writes the update data of the storage area in the common resource without decrypting such update data (i.e., in an encrypted state), or writes the update data of the storage area in the common resource upon decrypting the update data with a key before the key change and then re-encrypting such update data with a new key after the key change. Moreover, when the storage apparatus receives a restoration request from the computer or the management computer concerning a storage area that is undergoing a key change, it performs restoration processing according to the key change status of the storage area, and the update status of such storage area in the common resource.

According to the present invention, it is possible to increase the security of update data to be stored in a common resource and simultaneously enable an administrator to properly access the update data in the common resource.

DESCRIPTION OF DRAWINGS

FIG. 2 is a diagram showing the contents of a memory in a management computer according to an embodiment of the present invention;

FIG. 3 is a conceptual diagram showing the logical configuration of a computer system according to an embodiment of the present invention;

FIG. 5 is a chart showing physical disk management information according to an embodiment of the present invention;

FIG. 6 is a chart showing logical volume management information according to an embodiment of the present invention;

FIG. 9 is a chart showing key change information according to an embodiment of the present invention;

FIG. 10 is a chart showing common resource internal data management information according to an embodiment of the present invention;

FIG. 11 is a chart showing account information according to an embodiment of the present invention;

FIG. 12 is a chart showing role-definition information according to an embodiment of the present invention;

FIG. 16A to FIG. 16C are charts of key information in SLPR partition processing or SLPR connection processing according to an embodiment of the present invention;

FIG. 18A to FIG. 18C are charts of common resource internal data management information in SLPR partition processing or SLPR connection processing according to an embodiment of the present invention;

FIG. 23A and FIG. 23B are charts of key information in SLPR partition processing or SLPR connection processing according to another embodiment of the present invention;

FIG. 25 is a conceptual diagram showing the logical configuration of a computer system according to another embodiment of the present invention;

FIG. 28A to FIG. 28C are charts of common resource internal data management information in SLPR partition processing according to another embodiment of the present invention.

DETAILED DESCRIPTION

Embodiments of the present invention are now explained as the first embodiment, second embodiment and third embodiment. Incidentally, the embodiments explained below are merely examples, and the present invention shall not be limited thereby. Moreover, in the ensuing explanation, the process of logically partitioning or logically connecting the storage apparatus is referred to as SLPR partitioning or SLPR connection, and the storage area is referred to as a logical volume LU (Logical Unit).

(1) First Embodiment

The first embodiment is now explained with reference to FIG. 1 through FIG. 19.

(1-1) Physical System Configuration

Figure 1:
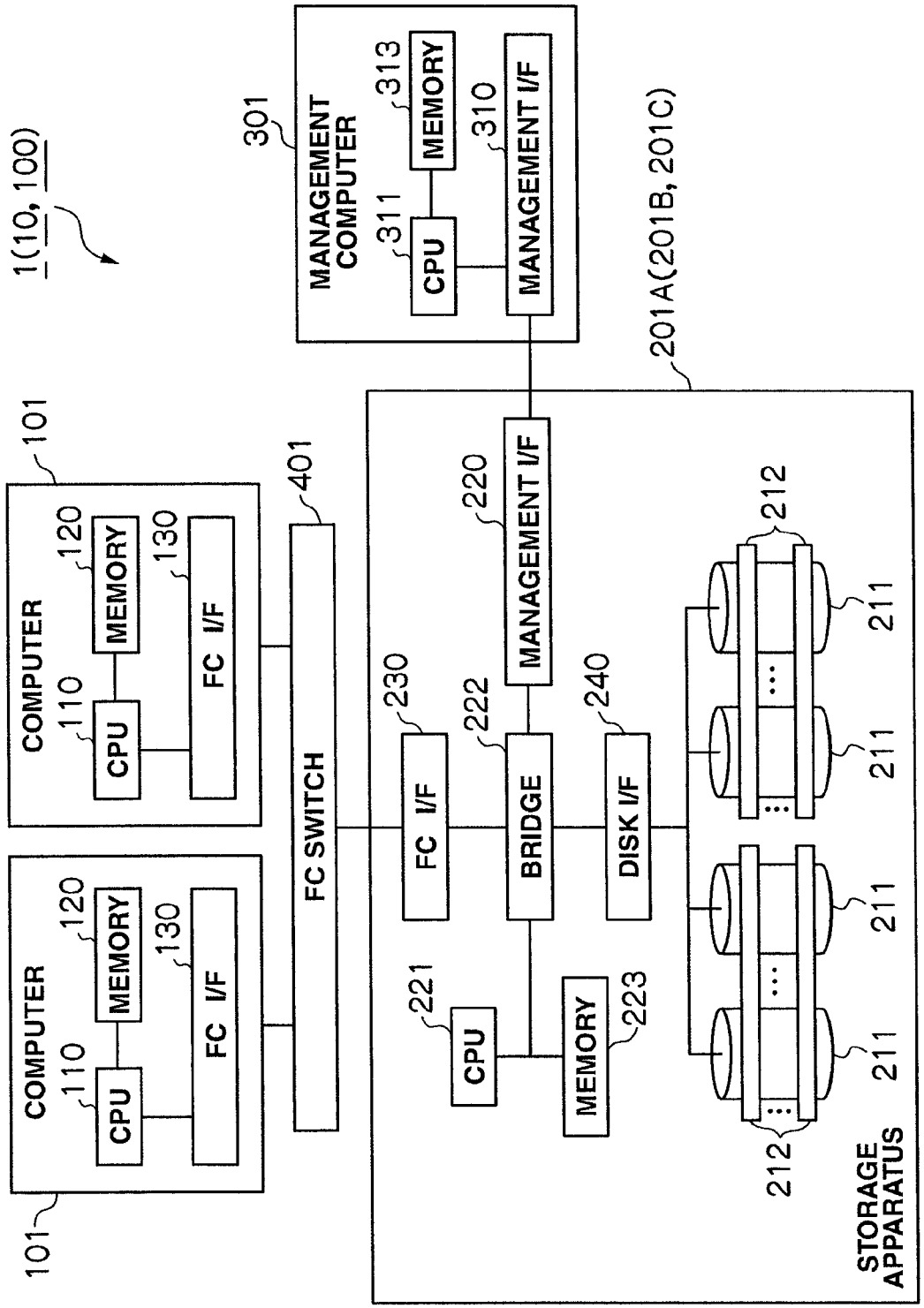
FIG. 1 is a block diagram showing the overall configuration of a computer system according to an embodiment of the present invention.

FIG. 1 shows the system configuration of the present embodiment.

A computer system 1 of the present embodiment is shown in FIG. 1.

The computer system 1 of this embodiment is configured by a plurality of computers 101 being connected to a storage apparatus 201A via a fibre channel switch (hereinafter referred to as the "FC switch") 401, and the storage apparatus 201A being connected to a management computer 301.

Each computer 101 comprises a CPU 110, a memory 120, and a fibre channel interface (hereinafter referred to as the "FC interface") 130. The memory 120 stores programs to be executed by the CPU 110, data read from the storage apparatus 201A, and data to be written in the storage apparatus 201A.

The computer 101 is connected to the FC switch 401 via the FC interface 130.

The storage apparatus 201A comprises an FC interface 230 (indicated as FC I/F in the diagrams) connected to the FC switch 401, a management interface 220 (indicated as management I/F in the diagrams) connected to the management computer 301, a disk device 211 for retaining data to be used by the computer 101, a disk interface 240 (indicated as disk I/F in the diagrams) connected to the disk device 211, a CPU 221 for controlling the programs in the storage apparatus 201A, a memory 223 for retaining programs to be executed by the CPU 221 and various types of management information to be used in managing the storage apparatus 201A, and a bridge 222 for controlling various types of data transfer such as the data transfer between the CPU 221 and the memory 223 and the data transfer between the respective interfaces 220, 230, 240 and the memory 223.

The storage apparatus 201A receives a Read/Write request from the computer 101 via the FC interface 230, and acquires the requested data from a logical volume LU provided by a storage area of the disk device 211 and writes the requested data in the logical volume LU via the disk interface 240. Incidentally, the storage apparatus 201A comprises a data encryption/decryption function. Details concerning the data encryption/decryption processing to be performed by the storage apparatus 201A upon receiving the Read/Write request from the computer 101 will be described later. Further, the storage apparatus 201A sends and receives various types of management information for managing the storage apparatus 201A to and from the management computer 301 via the management interface 220.

Incidentally, a plurality of FC interfaces 230, management interfaces 220, and disk interfaces 240 may be provided.

The management computer 301 comprises a management interface 310 connected to the storage apparatus 201A, a CPU 311 for performing processing in the management computer 301, and a memory 313 for retaining programs to be executed by the CPU 311 and data to be sent to and received from the management interface 310.

FIG. 2 shows a program stored in the memory 313 of the management computer 301. The memory 313 of the management computer 301 stores a storage apparatus management request program 315 for requesting the execution of the management operation of the storage apparatus 201A. As a result of the CPU 311 executing the storage apparatus management request program 515, it is possible to request the storage apparatus 201A to execute operations for managing the configuration and status of the storage apparatus 201A, such as creating and deleting a logical volume LU.

(1-2) Logical System Configuration

FIG. 3 shows the logical system configuration of the storage apparatus 201A. Below, an example of SLPR partitioning/SLPR connection of the storage apparatus 201A is explained with reference to FIG. 3. The storage apparatus 201A comprises logical volumes LU1 to LU3 and a common resource 213. The common resource 213 stores update data of the logical volume LU1 and update data of the logical volume LU3.

Here, update data refers to data before rewriting that arises when it becomes necessary to rewrite data in the logical volume LU after acquiring a snapshot of the logical volume LU at a certain point in time.

In the common resource 213, generation of update data is managed by update data arising from the first data rewriting after the acquisition of a snapshot being managed as first generation update data, and update data arising from the subsequent data rewriting being managed as second generation update data. The common resource 213 is a storage area configured from one or more logical volumes LU.

Further, although not shown, the storage apparatus 201A also comprises resources other than the logical volume LU such as communication ports and cache memories.

Incidentally, the storage apparatus 201A may also comprise logical volumes LU and common resources other than those illustrated in the diagrams.

Details concerning the configuration change in the storage apparatus 201A associated with SLPR partitioning/SLPR connection of the storage apparatus 201A in the example depicted in FIG. 3 are now explained.

The storage apparatus 201A is logically partitioned into SLPR1 and SLPR2. Thereupon, the logical volumes LU1, LU2 and the common resource 213 of the storage apparatus 201A are allocated to SLPR1, and the logical volume LU3 is allocated to SLPR2.

In addition, an administrator is assigned to SLPR1 for managing SLPR1, and an administrator is assigned to SLPR2 for managing SLPR2. Each SLPR administrator manages the SLPR to the extent of the SLPR resources allocated to itself. Management of the SLPR, for instance, is setting the capacity of the logical volume LU, and setting an access path from the computer to the logical volume LU.

An overall administrator for managing the overall storage apparatus 201A is able to manage both SLPR1 and SLPR2, and, for instance, is able to connect SLPR1 and SLPR2.

Incidentally, although not shown, resources (communication ports and cache memories) other than the logical volumes LU are also allocated to either SLPR upon the SLPR partitioning of the storage apparatus 201A.

Further, connection of SLPR1 and SLPR2 is performed as the opposite processing of SLPR partitioning.

(1-3) Various Programs and Various Types of Information Stored in Memory

Figure 4:
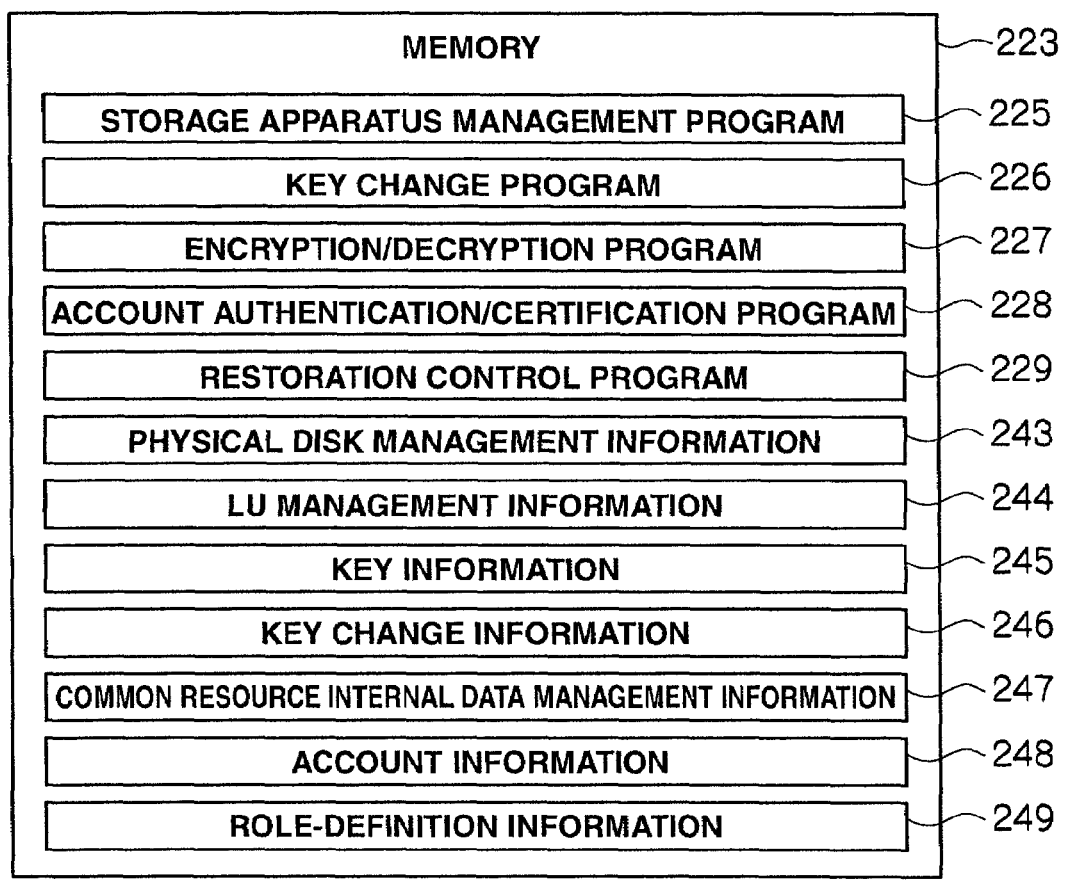
FIG. 4 is a diagram showing the contents of a memory in a storage apparatus according to an embodiment of the present invention.

FIG. 4 shows the programs and information stored in the memory 223 of the storage apparatus 201A. The memory 223 of the storage apparatus 201A stores a storage apparatus management program 225, a key change program 226, an encryption/decryption program 227, an account authentication/certification program 228, a restoration control program 229, physical disk management information 243, LU management information 244, key information 245, key change information 246, common resource internal data management information 247, account information 248, and role-definition information 249.

The storage apparatus management program 225 manages the storage apparatus 201A by performing SLPR partitioning or SLPR connection, newly creating or deleting logical volumes LU, setting the account information, and so on.

The key change program 226 changes the key (hereinafter referred to as the "LU key") to be used in encrypting or decrypting data of the logical volume LU. The LU key is changed, for instance, with the foregoing program when the affiliated SLPR of the logical volume LU is changed due to the SLPR partitioning or SLPR connection of the storage apparatus 201A.

The encryption/decryption program 227 encrypts data to be written in the logical volume LU or the common resource 213, and decrypts the encrypted data stored in the logical volume LU or the common resource 213. Incidentally, details regarding encryption/decryption processing based on the encryption/decryption program 227 will be described later.

The account authentication/certification program 228 verifies whether the administrator requesting management operation to the storage apparatus 201A is a legitimate administrator, and whether such administrator is authorized to perform management operation.

The restoration control program 229 receives a restoration request from the management computer 301, and, based on such restoration request, determines whether the logical volume to be used for the restoration and the update data of such logical volume LU in the common resource 213 are undergoing a key change, and performs restoration processing according to the key change status.

The physical disk management information 243, the LU management information 244, the key information 245, the key change information 246, the common resource internal data management information 247, the account information 248, and the role-definition information 249 will be explained later.

FIG. 5 shows the physical disk management information 243 stored in the memory 223 of the storage apparatus 201A.

The physical disk management information 243 is information for managing the disk device 211 provided in the storage apparatus 201A, and this information contains physical management information dependent on the physical configuration or arrangement in the storage apparatus 201A.

The physical disk management information 243 is configured from a "disk number" field 243A for specifying each disk device 211, a "capacity" field 243B showing the capacity of each disk device 211, a "RAID" field 243C showing the RAID (Redundant Arrays of Inexpensive Disks) configuration of each disk device 211, and a "RAID group number" field 243D showing the RAID group to which each disk device 211 is affiliated.

Incidentally, a RAID group is a group configured from a plurality of hard disk drives configuring a single RAID, and each disk device 211 has such a group.

FIG. 6 shows the LU management information 244 stored in the memory 223 of the storage apparatus 201A.

The LU management information 244 is information for managing a plurality of logical volumes LU logically created in a plurality of disk devices 211.

The LU management information 244 is configured from an "LU number" field 244A for specifying a plurality of logical volumes LU, a "disk number" field 244B showing the disk devices 211 configuring each logical volume LU, a "capacity" field 244C showing the capacity of each logical volume LU, a "RAID" field 244D showing the RAID configuration of each LU212, an "affiliated SLPR" field 244E showing the SLPR to which each logical volume LU is affiliated, a "common resource flag" field 244F showing whether each logical volume LU is using the common resource 213, and a "change status" field 244G showing whether each logical volume LU is undergoing a key change.

For instance, as shown in FIG. 6, when the "common resource flag" field 244F is "OFF," this shows a state where the common resource 213 is not set, and the update data is not stored. Meanwhile, when the "common resource flag" field 244F is "ON," this shows a state where the common resource 213 is set, and the update data is stored.

The indication of "changing (block number 10)" in the "change status" field 244G shows that the key change up to the $10^{th}$ block in the target logical volume LU is complete.

Figures 7, 8:
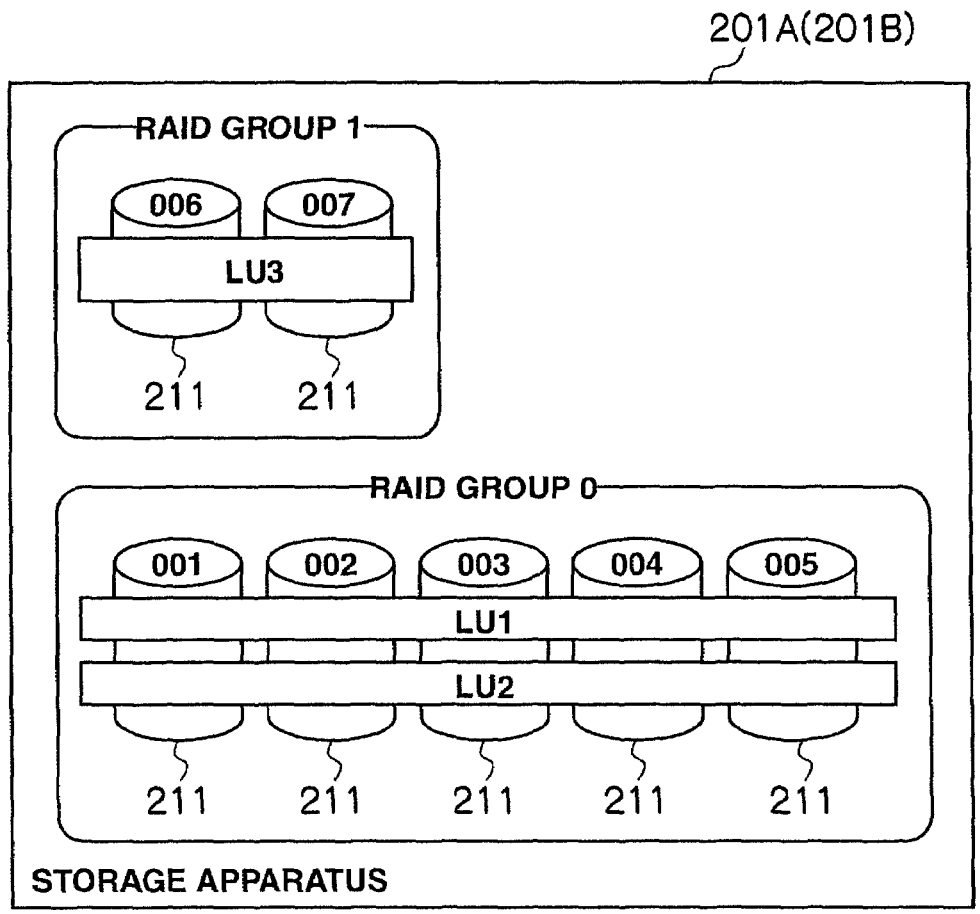
FIG. 7 is a conceptual diagram showing the logical configuration of a disk device according to an embodiment of the present invention.
FIG. 8 is a chart showing key information according to an embodiment of the present invention.

An example of the logical volumes LU created based on FIG. 6 is shown in FIG. 7.

A logical volume LU1 is created in the disk devices 211 of disk numbers 001 to 005 configuring a RAID group 0. A logical volume LU2 is similarly created in the disk devices 211 of disk numbers 001 to 005 configuring a RAID group 0. In addition, a logical volume LU3 is created in the disk devices 211 of disk numbers 006 and 007 configuring a RAID group 1.

FIG. 8 shows the key information 245 stored in the memory 223 of the storage apparatus 201A.

The key information 245 is information concerning the key to be used for encryption/decryption of the logical volume LU.

The key information 245 is configured from an "SLPR number" field 245A showing the SLPR, a "key number" field 245B showing the key to be used for the encryption/decryption of the logical volume LU in the SLPR, a "key data" field 245C showing the data information of the key, and a "change status" field 245D showing whether there is any logical volume LU affiliated with the SLPR that is undergoing a key change.

Incidentally, although a key is set for each SLPR in FIG. 8, a key may be set for each logical volume LU. Further, the SLPR in which "changing" is indicated in the "change status" field 245D cannot be subject to SLPR partitioning or SLPR connection, and may only be partitioned or connected after the key change is complete.

FIG. 9 shows the key change information 246 stored in the memory 223 of the storage apparatus 201A.

The key change information 246 is information showing the key to be used for the encryption/decryption of the logical volume LU that is undergoing a key change.

The key change information 246 is configured from an "LU number" field 246A showing the number of the logical volume LU to which key change is to be performed, a "key (before change)" field 246B showing a pre-change key in the key change of the logical volume LU, a "key number" field 246B1 showing a key number of the "key (before change)" field 246B, a "key data" field 246B2 showing key data of the "key (before change)" field 246B, a "key (after change)" field 246C showing a post-change key in the key change of the logical volume LU, a "key number" field 246C1 showing a key number of the "key (after change)" field 246C, a "key data" field 246C2 showing key data of the "key (after change)" field 246C, and a "change status" field 246D showing the status of the key change of the logical volume LU.

Incidentally, a logical volume LU in which the "change status" field 246D is an empty column shows that the key change of the logical volume LU is complete, or key change has not been performed. Further, a logical volume LU with "changing" indicated in the "change status" field 246D shows that the key of the logical volume LU is undergoing a key change. Specifically, this shows that the data of the logical volume LU or the update data of the logical volume LU in the common resource 213 is being changed using a pre-change key or a post-change key.

Although not specified in FIG. 9, when the key change of a key to be used for a certain logical volume LU is complete, the key information in the "key (after change)" field 246C of the key change information 246 is overwritten on the key information of the "key (before change)" field 246B, and the indication in the "key (after change)" field 246C and the "change status" field 246D will become empty columns.

For example, with the logical volume LU3 of LU number 3, since "changing" is indicated in the "change status" field 246D, this shows that data of the logical volume LU3 and update data of the logical volume LU in the common resource 213 are being decrypted using a pre-change key (key in which the key number 246B1 is 1) and re-encrypted using a post-change key (key in which the key number 246C1 is 2).

Incidentally, the value in the "key number" field 246B1 and the "key number" field 246C1 corresponds to the value in the "key number" field 245B, and shows that keys with the same key number are the same key.

FIG. 10 shows the common resource internal data management information 247 stored in the memory 223 of the storage apparatus 201A.

The common resource internal data management information 247 is information for managing the update data of the logical volume LU stored in each common resource 213.

The common resource internal data management information 247 is configured from a "common resource number" field 247A showing the number of the common resource 213, an "SLPR number" field 247B showing the number of the SLPR to which the common resource 213 is affiliated, an "LU number" field 247C showing the number of the logical volume LU to use the common resource 213, an "SLPR number" field 247D showing the number of the SLPR to which the logical volume LU is affiliated, and a "change status" field 247E showing the status of key change of the update data in the common resource 213 of the logical volume LU.

For example, when the "change status" field 247E is an empty column, this shows that the key change of the update data in the common resource 213 is complete, or that key change has not been performed. Further, when "changing" is indicated in the "change status" field 247E, this shows that the update data in the common resource 213 is being changed using a pre-change key or a post-change key. For instance, with the logical volume LU 3 of LU number 3, since "changing (block number 5)" is indicated in the "change status" field 247E, this shows that the key change is complete up to block number 5 in the update data in the common resource 213.

FIG. 11 shows the account information 248 stored in the memory 223 of the storage apparatus 201A.

The account information 248 contains the administrator's user ID, password, and role information.

The account information 248 is configured from a "user ID" field 248A and a "password" field 248B to be used when an administrator performs management operation to the storage apparatus 201A, and a "role" field 248C showing the administrator's operation authority in the storage apparatus 201A.

Incidentally, the account information 248 may be such that one user ID248a has a plurality of roles 248c. Details regarding the role will be described later with reference to FIG. 11.

Incidentally, although a user ID and a password are used as the account information for identifying the administrator in the present embodiment, a session may be established between the storage apparatus 201A and the management computer 301, and an established session ID or the like may be additionally used.

FIG. 12 shows the role-definition information 249 stored in the memory 223 of the storage apparatus 201A.

The role-definition information 249 is information for prescribing the operations that can be performed by the administrator in the storage apparatus 201A.

The role-definition information 249 is configured from a "role name" field 249A, an "SLPR" field 249B showing the SLPR that can be managed by the administrator, and a "key" field 249C showing the key that can be managed by the administrator. Here, management of a key refers to operations concerning the key such as backing up or updating the key. In FIG. 12, for instance, the SLPR1 administrator is able to create a logical volume LU in SLPR1, refer to the key to be used for the encryption/decryption of the logical volume LU in SLPR1, or back up the logical volume LU as operations for managing the resources in SLPR1.

Further, the role may be divided in further detail. For example, the role of the SLPR1 administrator may be divided into an account management role for performing account management such as setting the user ID and password, and a storage management role for performing storage management such as creating a logical volume LU.

In FIG. 12, although the overall administrator has the management authority for "all" "SLPRs" and "all" "keys", such authority may be transferred to each SLPR administrator so that the overall administrator will not have any management authority concerning these resources.

(1-4) Read/Write Processing of Logical Volume Not Undergoing Key Change

The data encryption/decryption processing to be performed by the storage apparatus 201A which received a Read/Write request from the computer 101 is now explained.

Figure 13:
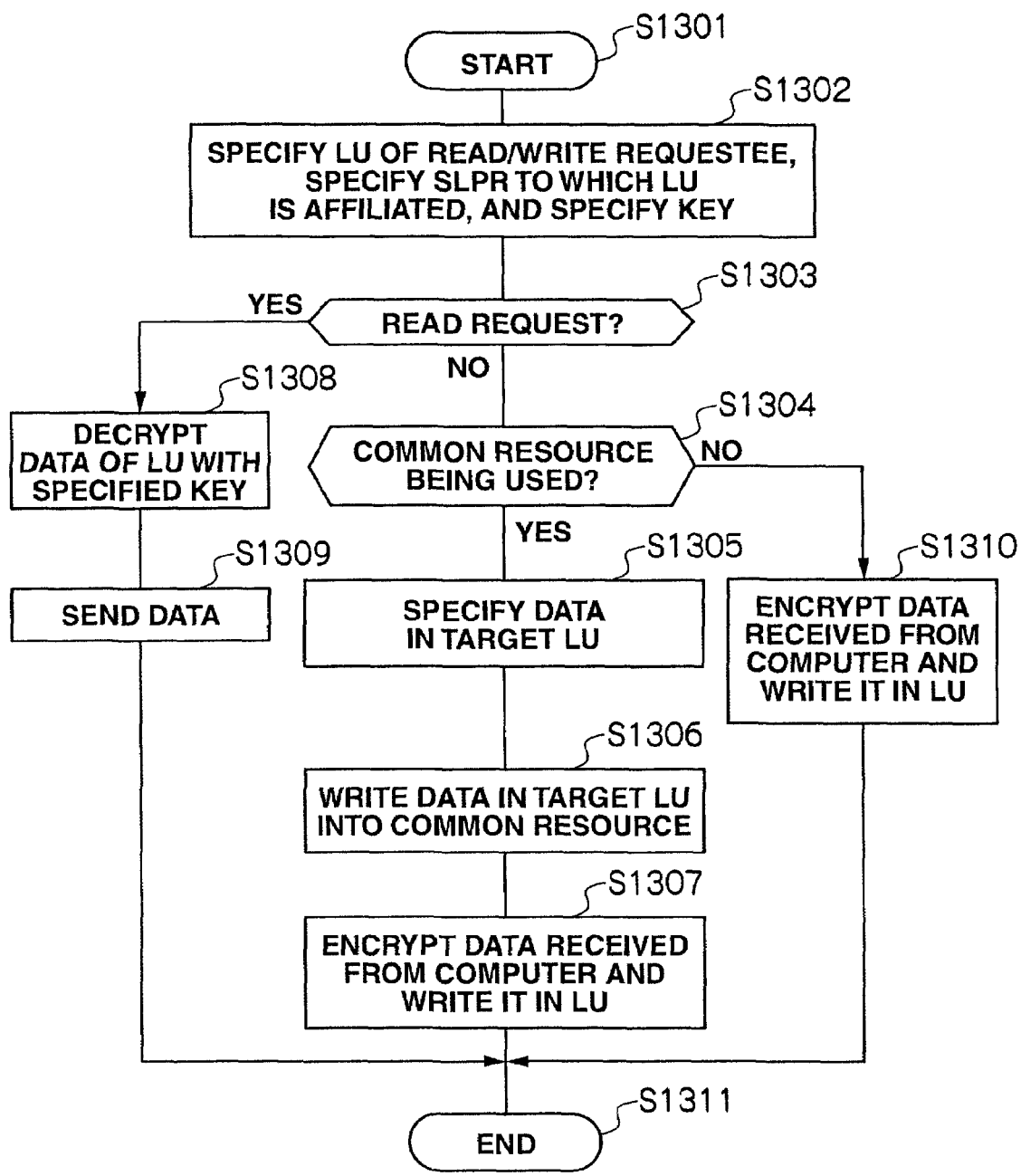
FIG. 13 is a flowchart showing Read/Write processing according to an embodiment of the present invention.

Foremost, as shown in FIG. 13, a flowchart of receiving a Read/Write request from the computer 101 in relation to a logical volume LU when key change processing of the key to be used for the logical volume LU is not being executed is explained. Read/Write processing is executed by the CPU 221 of the storage apparatus 201A based on the encryption/decryption program 227.

Specifically, foremost, the CPU 221 of the storage apparatus 201A starts the Read/Write processing upon receiving a Read/Write request of data from the computer 101 (S1301A). Information received from the computer 101 contains information showing whether the operation requested by the computer 101 is reading or writing, information of the logical volume LU of the Read/Write requestee, and write data in the case of a Write request.

Subsequently, the CPU 221 specifies the logical volume LU of the Read/Write requestee based on the information received at step S1301 (S1302). The CPU 221 thereafter refers to the LU management information 244, and specifies the SLPR to which the specified logical volume LU is affiliated (S1302). Further, the CPU 221 refers to the key information 245, and specifies the key to be used for the specified SLPR (S1302).

Subsequently, the CPU 221 determines whether the request from the computer received at step S1301 is a Read request or a Write request (S1303).

When the CPU 221 determines that this request is a Read request (S1303: YES), it uses the key specified at step S1302 to decrypt the encrypted data stored in the logical volume LU (S1308). The CPU 221 thereafter sends the decrypted data to the computer 101 (S1309), and then ends this processing (S1311).

Meanwhile, when the CPU 221 determines at step S1303 that this request is a Write request (S1303: NO), it refers to the LU management information 244 and determines whether the logical volume LU of the Write requestee is using the common resource 213 (S1304).

When the CPU 221 determines at step S1304 that the logical volume LU of the Write requestee is using the common resource 213 (S1304: YES), it encrypts the write data received from the computer 101 using the key specified at step S1302.

Before writing the encrypted data in the logical volume LU of the Write requestee and updating the data, the CPU 221 specifies the data pre-stored in the logical volume LU which is overwritten by this updating (S1305).

Subsequently, the CPU 221 reads the foregoing pre-stored data to be overwritten from the logical volume LU of the Write requestee, without decrypting such data, and writes it in the common resource 213 (S1306). As a result of this write processing, the update data stored in the common resource 213 is updated.

The CPU 221 thereafter writes the encrypted data in the logical volume LU of the Write requestee designated by the computer 101 (S1307), and then ends this processing (S1311).

Meanwhile, when the CPU 221 determines at step 1304 that the logical volume LU of the Write requestee is not using the common resource 213 (S1304: NO), it encrypts the write data received from the computer 101 using the key specified at step S1302, writes the encrypted data in the logical volume LU of the Write requestee (S1310), and then ends this processing (S1311).

Incidentally, as another mode of step S1306, the following mode may be considered. In other words, the CPU 221 decrypts the data in the logical volume LU updated at step S1305 using the key specified at step S1302. The CPU 221 thereafter re-encrypts the decrypted data using the key of the SLPR to which the common resource 213 is affiliated, and then writes the encrypted data in the common resource 213. In the case of this mode, the CPU 221 will need to separately refer to management information showing to which SLPR the common resource 213 is affiliated.

(1-5) SLPR Partition Processing

The routine of performing encryption/decryption processing to the logical volume LU upon executing key change processing of the key to be used for the logical volume LU is now explained. The key change processing of the key to be used for the logical volume LU is executed when the storage apparatus 201A performs SLPR partitioning/SLPR connection.

Figure 14:
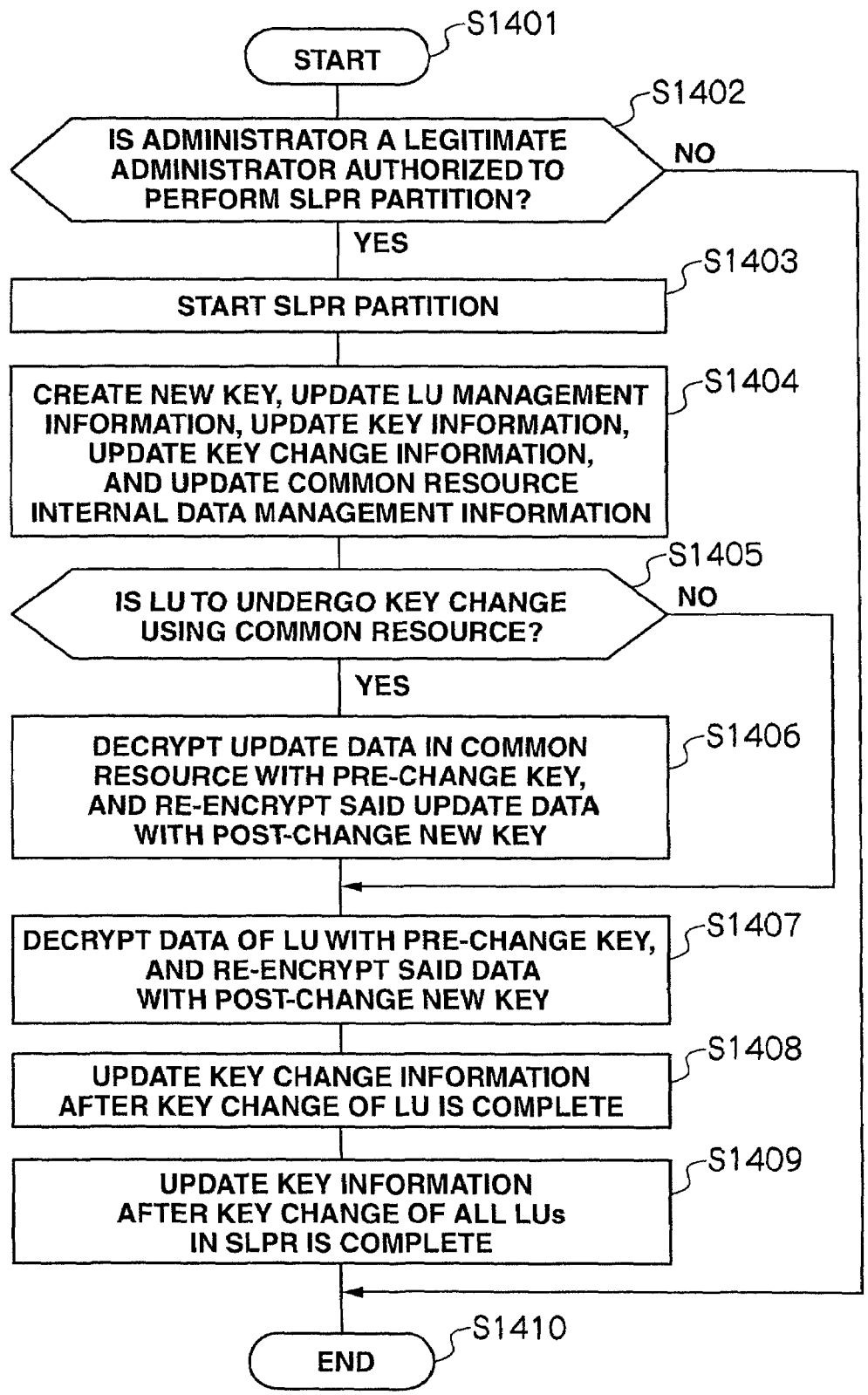
FIG. 14 is a flowchart showing SLPR partition processing according to an embodiment of the present invention.

Foremost, a case of executing key change processing pursuant to the storage apparatus 201A performing SLPR partitioning is explained with reference to the flowchart illustrated in FIG. 14. In FIG. 14, the CPU 221 of the storage apparatus 201A executes such key change processing based on the storage apparatus management program 225, the key change program 226, the encryption/decryption program 227, and the account authentication/certification program 228.

When the CPU 221 of the storage apparatus 201A receives an SLPR partitioning request from the management computer 301, it starts this processing (S1401). For example, the CPU 221 receives a request for partitioning the storage apparatus 201A into SLPR1 and SLPR2.

Incidentally, information received from the management computer 301 at step S1401 contains user ID information and password information of the administrator to use the management computer 301, and contents of the operation requested by the administrator (partitioning of the storage apparatus 201A into SLPR1 and SLPR2).

Subsequently, the CPU 221 refers to the account information 248 based on the account authentication/certification program 228. The CPU 221 thereafter determines whether the user ID information and password information received from the management computer 301 is legitimate, and whether the administrator who issued the SLPR partitioning request from the management computer 301 is authorized to perform such operation (S1402).

When the CPU 221 determines that the user ID information and password information is legitimate, and the administrator is a legitimate administrator (S1402: YES), it starts the SLPR partitioning based on the storage apparatus management program 225 (S1403).

In this flowchart, SLPR partitioning refers to the process of logically partitioning the managerial jurisdiction of the storage apparatus 201A, and specifically refers to the process of allocating resources such as logical volumes LU and ports of the storage apparatus 201A to each SLPR (for instance, SLPR1 or SLPR2) so as to enable each SLPR to individually manage the allocated resources.

The CPU 221 creates a new key based on the key change program 226 (S1404). In addition, the CPU 221 updates the LU management information 244, the key information 245, the key change information 246 and the common resource internal data management information 247 pursuant to the logical volume LU allocated based on SLPR partitioning or the creation of a key to be used by the logical volume LU (S1404).

Here, the update of the key information 245, the key change information 246 and the common resource internal data management information 247 is depicted in FIG. 16 to FIG. 18.

Foremost, FIG. 16A to FIG. 16C depict the key information 24 before, during and after SLPR partitioning.

Since "-" is indicated in the "SLPR number" field 245A of FIG. 16A, this shows that there is no SLPR in the storage apparatus 201A, and SLPR partitioning has not been performed. Further, since "1" is indicated in the "key number" field 245B, this shows that data encryption/decryption is performed using the key of key number "1" to the update data in all logical volumes LU and common resources 213 in the storage apparatus 201A before SLPR partitioning. Further, since the "change status" field 245D is an empty column, this shows that there is no logical volume LU that is undergoing a key change.

SLPR "1" and SLPR "2" are indicated in the "SLPR number" field 245A of FIG. 16B. Further, whereas a key (key in which the key number 245b is 1) that is the same as before SLPR partitioning is used in SLPR1, a new key (key in which the key number 245b is 2) that is different from before SLPR partitioning is used in SLPR2. Thus, this shows that a new key is being created and key change is being performed based on SLPR partitioning.

In SLPR2 undergoing a key change, key change of the logical volume LU in SLPR2 is performed. Here, key change of the logical volume LU refers to the process of updating data by using a pre-change key to decode data in the logical volume LU stored before the key change is performed and update data of the logical volume LU in the common resource 213 when the logical volume LU is to use the common resource 213 and thereafter using a post-change key to re-encrypt such data and update data based on the key change information 246. After the key is changed, data of the logical volume LU and update data of the logical volume LU in the common resource 213 are encrypted/decrypted using the post-change key. Since "changing" is indicated in the "change status" field 245D of SLPR2, this shows that a logical volume LU undergoing a key change exists in the SLPR2.

After the key change in the SLPR2 is complete, the key information 245 becomes the state illustrated in FIG. 16C.

Figure 17A:
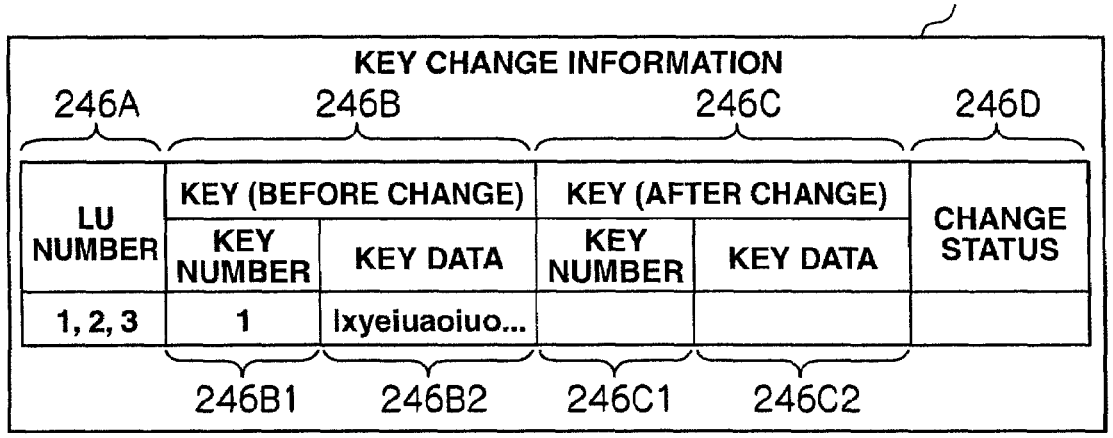
FIG. 17A to FIG. 17C are charts of key change information in SLPR partition processing or SLPR connection processing according to an embodiment of the present invention.
Figure 17B:
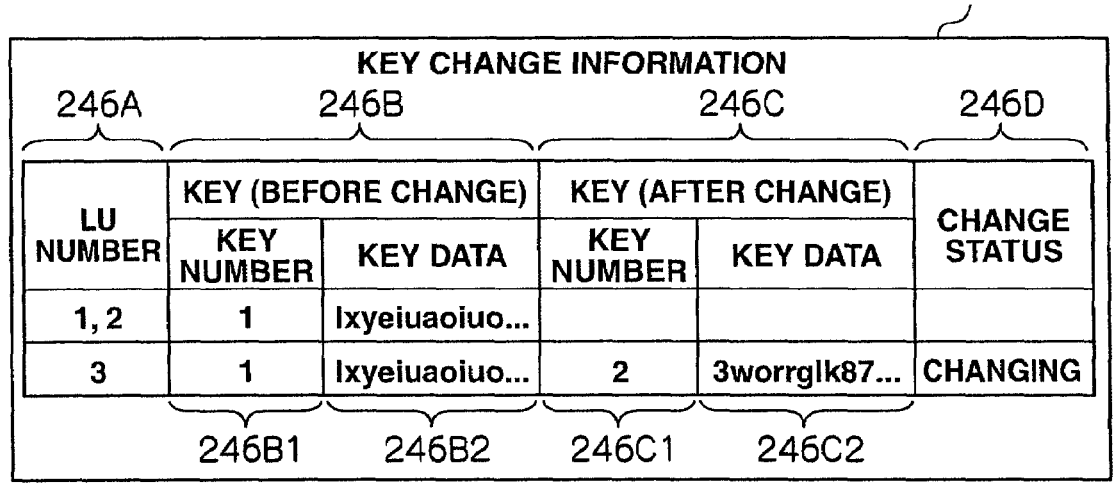
Figure 17C:
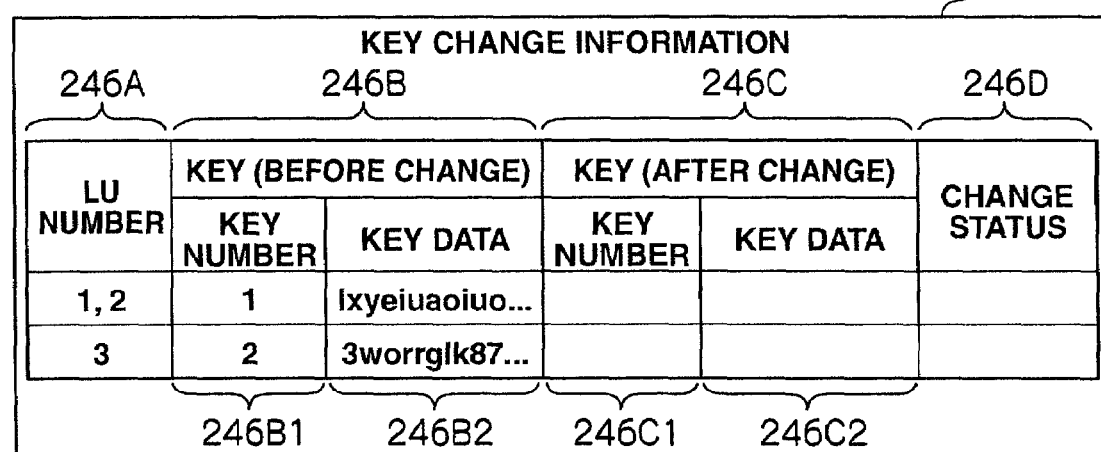

Subsequently, FIG. 17A to FIG. 17C depict the key change information 246 before, during and after SLPR partitioning.

Since the "change status" field 246D is an empty column in FIG. 17A, this shows that a key to be used for the logical volume LU is not undergoing a key change at the present moment.

In FIG. 17B, since "changing" is indicated in the "change status" field 246D of the logical volume LU3, this shows that the key of key number "1" is being changed to the key of key number "2."

The key change information 246 after the foregoing key change is complete will become the state illustrated in FIG. 17C.

Subsequently, FIG. 18A to FIG. 18C depict the common resource internal data management information 247 before, during and after SLPR partitioning.

FIG. 18A shows that the logical volumes LU "1" and LU "3" are using the common resource "1." Further, since the "change status" field 247E of the logical volumes LU1 and LU3 is an empty column, this shows that the key change of update data of the logical volumes LU1 and LU3 in the common resource 213 is not being performed at the present moment.

In FIG. 18B, since "changing (block number 5)" is indicated in the "change status" field 247E of the logical volume LU3, this shows that the key change up to the $5^{th}$ block of the update data of the logical volume LU3 in the common resource 213 is complete. The common resource internal data management information 247 after the foregoing key change is complete will become the state illustrated in FIG. 18C.

Subsequently, the CPU 221 refers to the common resource internal data management information 247 and determines whether the logical volume LU to undergo a key change is using the common resource 213 (S1405).

When the CPU 221 determines that the logical volume LU to undergo a key change is using the common resource 213 (S1405: YES), it refers to the key change information 246 and uses a pre-change key to decrypt the update data of the logical volume stored in the common resource 213 before SLPR partitioning, and uses a post-change key to re-encrypt such update data (S1406).

For example, since the logical volume LU3 is using the common resource 213 and will undergo a key change based on SLPR partitioning as shown in FIG. 17B, update data of the logical volume LU3 in the common resource 213 will be decrypted with a key of key number "1" and re-encrypted with a key of key number "2."

When the CPU 221 determines that the logical volume LU to undergo a key change is not using the common resource 213 (S1405: NO) or when it executes the processing at step S1406, the CPU 221 refers to the key change information 246 and uses a pre-change key to decrypt data of the logical volume LU and uses a post-change key to re-encrypt such data (S1407).

For example, data of the logical volume LU3 is decrypted with a key of key number "1" and re-encrypted with a key of key number "2" based on the key change information 246 shown in FIG. 17B.

Incidentally, although step S1407 is performed after step S1406 in this flowchart, both steps may be performed in parallel in the flowchart. Further, when the key change processing at step S1406 is complete, the indication in the "change status" field 247E of the logical volume LU is updated from "changing" to an empty column, and, when the key change processing at step S1407 is complete, the indication in the "change status" field 244G of the logical volume LU is updated from "changing" to an empty column.

Subsequently, after the key change of the key to be used for the logical volume LU is complete, the CPU 221 updates the key change information 246 of the logical volume LU that underwent a key change (S1408). Specifically, the key information in the "key (after change)" field 246C of the key change information 246 is overwritten on the key information of the "key (before change)" field 246B, and the indication in the "key (after change)" field 246C and the "change status" field 246D is updated to an empty column.

The CPU 221 thereafter updates the key information 245 (S1408). Specifically, in the key information 245 after the processing at step S1404, after changing the key to be used for all logical volumes LU in the SLPR, the indication in the "change status" field 245D is updated from "changing" to an empty column (S1409).

When the processing at step S1409 is finished, the CPU 221 ends the SLPR partition processing (S1410).

Incidentally, when the CPU 221 determines at step S1402 that the various types of information are illegitimate and the administrator is not a legitimate administrator (S1402: NO), it ends the SLPR partition processing (S1410).

(1-6) SLPR Connection Processing

Figure 15:
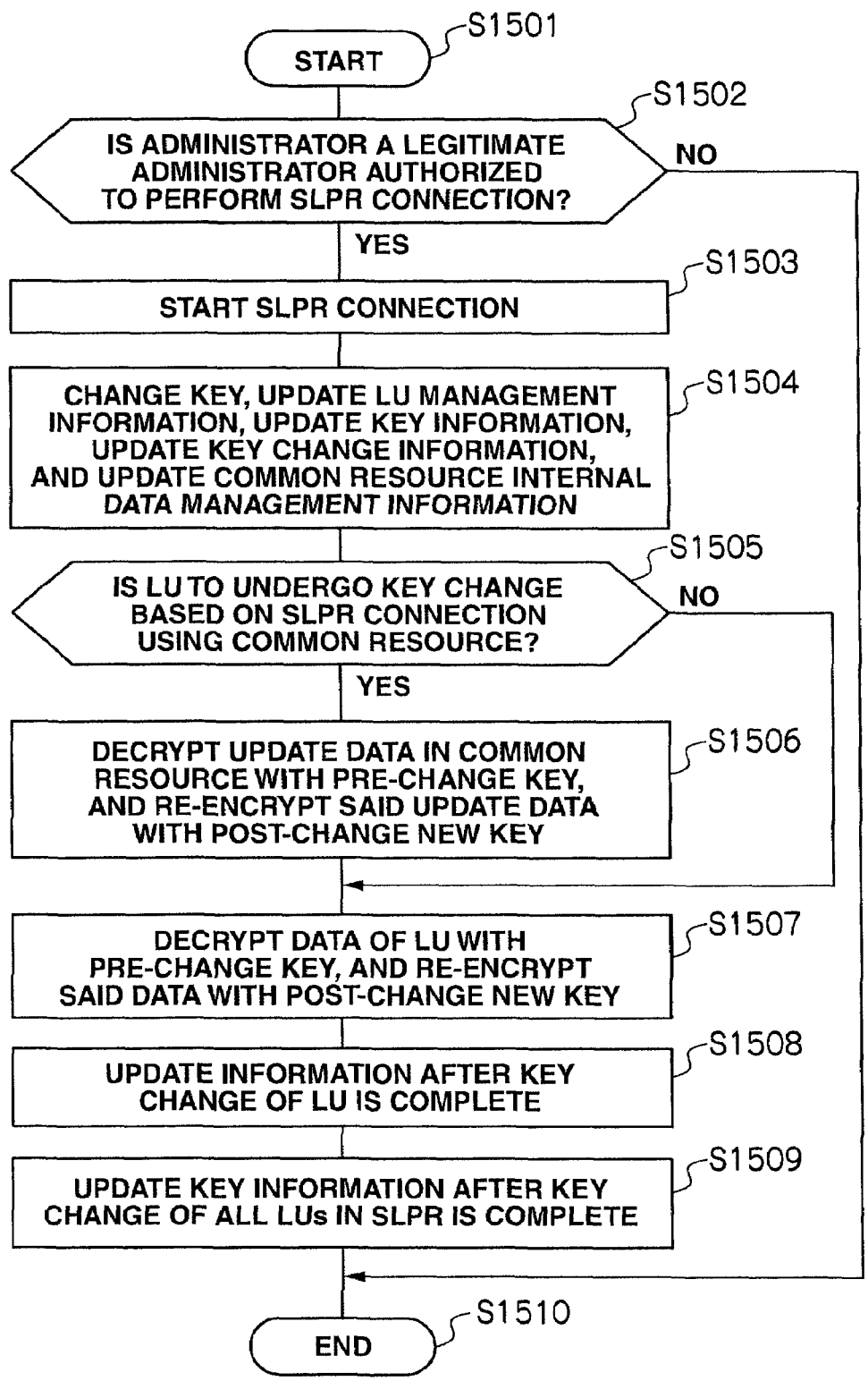
FIG. 15 is a flowchart showing SLPR connection processing according to an embodiment of the present invention.

A case of performing key change processing pursuant to the CPU 221 of the storage apparatus 201A executing SLPR connection is now explained with reference to the flowchart illustrated in FIG. 15. In FIG. 15, as with FIG. 14, the CPU 221 of the storage apparatus 201A executes such key change processing based on the storage apparatus management program 225, the key change program 226, the encryption/decryption program 227, and the account authentication/certification program 228.

Incidentally, when the processing steps in the SLPR connection processing is the same as the processing steps in the foregoing SLPR partition processing, the detailed explanation thereof will be omitted.

Foremost, when the CPU 221 receives an SLPR connection request from the management computer 301, it starts the SLPR connection processing (S1501). For example, the CPU 221 receives from the management computer 301 a request for connecting SLPR1 and SLPR2.

SLPR connection in this flowchart is the process of logically connecting the managerial jurisdiction of the storage apparatus 201A, and specifically the process of allocating resources such as the logical volumes LU and ports, which were independently managed for each SLPR, to each SLPR to be connected or to the overall storage apparatus 201A so as to enable the management of resources in connected units.

The CPU 221 thereafter uses the account authentication/certification program 228 to authenticate the administrator requesting the operation at step S1501, and determines whether the administrator is authorized to perform such operation (S1502).

At step S1502, when the CPU 221 determines that the administrator is a legitimate administrator and is authorized to perform operations to the storage apparatus 201A (S1502: YES), the CPU 221 starts the SLPR connection based on the storage apparatus management program 225 (S1503).

Subsequently, the CPU 221 uses the key change program 226 to perform the key change arising from the SLPR connection, and updates the LU management information 244, the key information 245, the key change information 246 and the common resource internal data management information 247 (S1504).

Here, the update of the key information 245, the common resource internal data management information 247 and the key change information 246 is explained with reference to FIG. 16, FIG. 17, and FIG. 18.

As common items in FIG. 16, FIG. 17, and FIG. 18, each FIG. C represents the status before SLPR connection, each FIG. B represents the status during SLPR connection, and each FIG. A represents the status after SLPR connection.

Incidentally, in this SLPR connection processing, as evident upon comparing FIG. 16C and FIG. 16A, only the key of SLPR2 is changed from key number "2" to key number "1," and the key to be used only in the logical volume LU3 affiliated with SLPR2 will thereby be changed.

With respect to the update of the key information 245, as shown in FIG. 16C before SLPR connection, the "change status" field 245D of SLPR1 and SLPR2 is an empty column. When the CPU 221 thereafter executes SLPR connection, as shown in FIG. 16B, the "change status" field 245D is updated to "changing." When the key change of SLPR2 is complete and the SLPR connection is finished, the key information 245 becomes the state illustrated in FIG. 16A.

With respect to the key change information 246, as shown in FIG. 17C, in the initial status before SLPR connection, the "key number" field 246C1 in the "key (after change)" field 246C of the logical volume LU3, the "key data" field 246C2 and the "change status" field 246D are empty columns. When the CPU 221 executes SLPR connection, information of key number "1" of FIG. 16A is set in the "key (after change)" field 246C of the logical volume LU3, and the "change status" field 246D is updated to "changing." When the key change of the logical volume LU3 is complete, the key change information 246 becomes the status illustrated in FIG. 17A.

With respect to the common resource internal data management information 247, as shown in FIG. 18C, in the initial status before SLPR connection, the "change status" field 247E of the logical volume LU3 is an empty column. When the CPU 221 executes SLPR connection, as shown in FIG. 18B, the "change status" field 247E is updated to "changing (block number 5)." When the key change processing of the key to be used for the update data of the logical volume LU3 in the common resource 213 is complete, the common resource internal data management information 247 becomes the state illustrated in FIG. 18A.

The CPU 221 refers to the common resource internal data management information 247, and determines whether the logical volume LU to undergo a key change is using the common resource 213 (S1505).

When the CPU 221 determines that the logical volume LU to undergo a key change is using the common resource 213 (S1505: YES), it refers to the key change information 246 and uses a pre-change key to decrypt the update data of the logical volume LU stored in the common resource 213 before the SLPR connection, and uses a post-change key to re-encrypt such update data (S1506).

Meanwhile, when the CPU 221 determines that the logical volume LU to undergo a key change is not using the common resource 213 (S1505: NO), or when it executes the processing at step S1506, the CPU 221 refers to the key change information 246 and uses a pre-change key to decrypt the data of the logical volume LU, and uses a post-change key to re-encrypt such data (S1506).

Incidentally, although step S1507 is performed after step S1506 in this flowchart, both steps may be performed in parallel in the flowchart.

Further, when the key change processing at step S1506 is complete, the indication in the "change status" field 247E of the logical volume LU is updated from "changing" to an empty column, and, when the key change processing at step S1507 is complete, the indication in the "change status" field 244G of the logical volume LU is updated from "changing" to an empty column.

Subsequently, after the key change of the key to be used for the logical volume LU is complete, the CPU 221 updates the key change information 246 (S1508). Specifically, the CPU 211 refers to the key change information 246 and overwrites the information in the "key (after change)" field 246C used for the logical volume LU in the "key (before change)" field 246B, and the indication in the "key (after change)" field 246C and the "change status" field 246D is updated to an empty column.

The CPU 221 updates the key information 245 after the key change of the key used for all logical volumes LU in SLPR is complete (S1509). Specifically, with the SLPR in which "changing" is indicated in the "change status" field 245D at step S1504, the CPU 221 updates the "change status" field 245D to an empty column after the key change of the key to be used for all logical volumes LU in the SLPR is complete (S1509).

When the CPU 221 completes the processing at step S1509, it ends the SLPR connection processing (S1510).

Incidentally, when the CPU 221 determines at step S1502 that the various types of information are illegitimate and the administrator is not a legitimate administrator (S1502: NO), it ends the SLPR connection processing (S1510).

(1-7) New Write Processing to Common Resource on LU Undergoing Key Change

A case of performing new write processing to the common resource 213 when the CPU 221 of the storage apparatus 201A receives a Write request from the computer to write data in a logical volume LU undergoing a key change when the CPU 221 is executing a key change of the key to be used for the data of the logical volume LU is now explained with reference to FIG. 19.

Incidentally, the processing to be performed upon receiving a Write request from the computer 101 for writing data in a logical volume not yet subject to a key change has been explained with reference to the flowchart illustrated in FIG. 13.

New write processing is executed by the CPU 221 of the storage apparatus 201A based on the encryption/decryption program 227.

When the CPU 221 receives a Write request from the computer for writing data in a logical volume undergoing a key change, it starts the new write processing (S1901).

Here, a logical volume LU undergoing a key change refers to the status of updating the "change status" field 244G of the LU management information 244, and the "key (after change)" field 246C and the "change status" field 246D of the key change information 246.

When the CPU 221 receives a Write request from the computer 101, it specifies the "change status" field 244G of the key change information 246 and the LU management information 244 corresponding to the logical volume LU of the Write requestee (S1902).

Subsequently, upon using a post-change key to encrypt the data received from the computer 101 and writing such encrypted data in the logical volume LU, the CPU 221 determines whether the blocks of the logical volume LU to be written have undergone a key change (S1903).

Incidentally, the determination at this step is made by the CPU 221 comparing the block number to be written requested by the computer 101 and the block number of the "change status" field 244G showing up to which block of the logical volume LU has undergone a key change. When the block number to be written is smaller than the block number of the "change status" field 244G, the CPU 221 determines that the blocks of the logical volume LU to be written have undergone a key change.

When the CPU 221 determines that the blocks of the logical volume LU to be written have undergone a key change (S1903: YES), it writes the data stored in the logical volume LU in a state before writing data from the computer 101 into the common resource 213 as update data without decrypting said data, encrypts the write data from the computer 101, and writes the encrypted data in the logical volume (S1904).

When the CPU 221 determines that the blocks of the logical volume LU to be written have not undergone a key change (S1903: NO), it determines whether the blocks to be written include both a key-changed status and a key-unchanged status (S1905).

Here, assumed is a case where the range of blocks is from block 1 to block 100 in the logical volume LU to be written. For instance, both a key-changed status and a key-unchanged status refers to a status where key change processing in the range from block 1 to block 45 is complete, but the key change processing in the range from block 46 to block 100 is incomplete.

When the CPU 221 determines that the blocks to be written include both a key-changed status and a key-unchanged status (S1905: YES), it stands by for a fixed time (S1906), and thereafter returns once again to step S1903.

Meanwhile, when the CPU 221 determines that the blocks to be written do not include both a key-changed status and a key-unchanged status (S1905: NO); that is, when the CPU 221 determines that all blocks are key-unchanged blocks, it uses a pre-change key to decrypt the data stored in the logical volume LU in a state before writing data from the computer 101, uses a post-change key to encrypt such data, and writes it in the common resource (S1907).

The CPU 221 thereafter uses a pre-change key to encrypt the data received from the computer 101 and writes the encrypted data in the logical volume LU (S1908), and then ends this new write processing (S1909).

Incidentally, in this flowchart, the encrypted data in the logical volume LU to be stored pursuant to the key change will not be newly written in the common resource 213. This is to prevent the redundant writing of data having the same contents during decryption, since only the encryption key is different, when writing the encrypted data in the logical volume LU to be stored pursuant to the key change into the common resource 213. It is thereby possible to prevent the common resource 213 from being additionally burdened.

Figure 19:
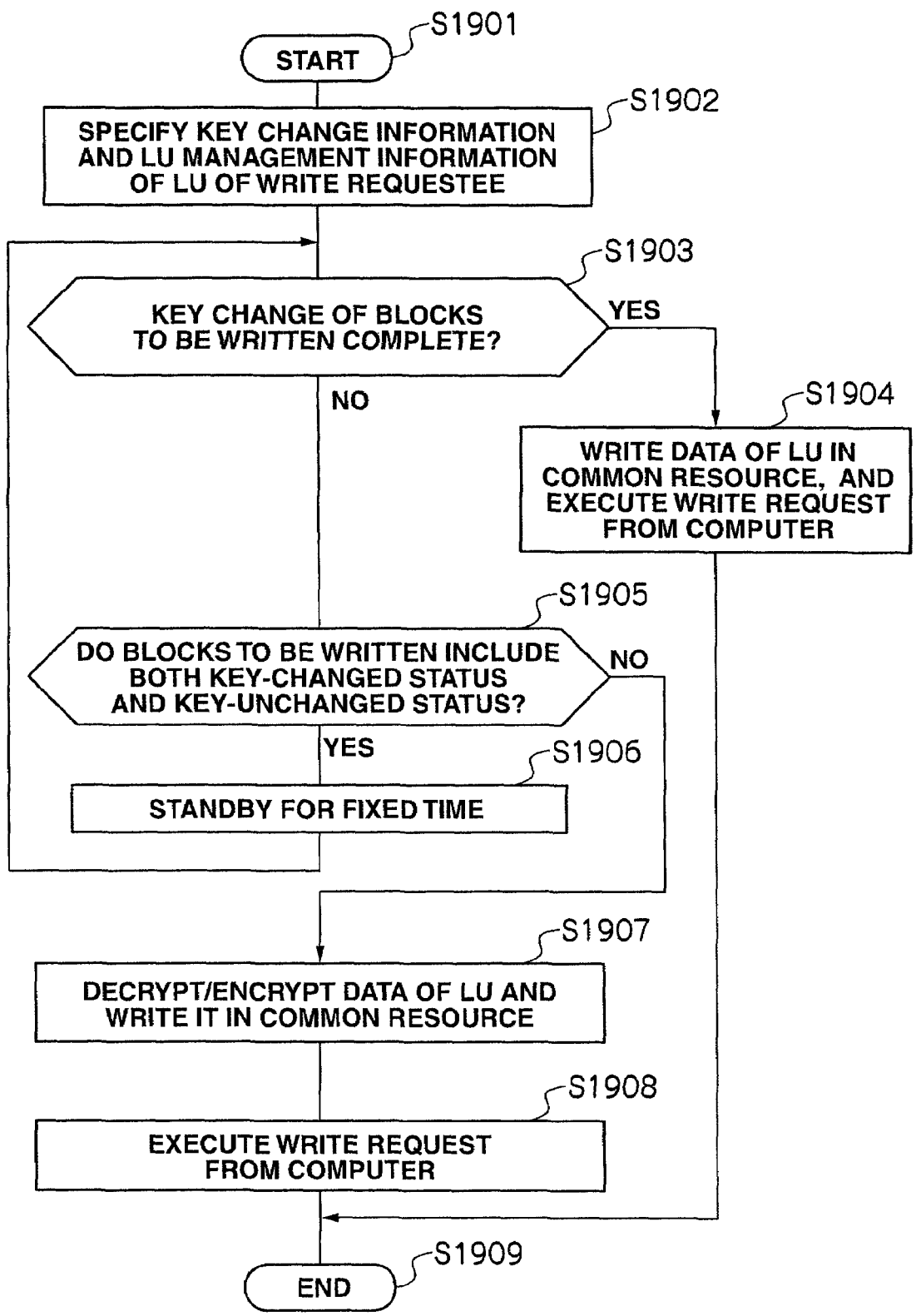
FIG. 19 is a flowchart showing Read/Write processing during a key change of the key to be used in a logical volume according to an embodiment of the present invention.

However, the present embodiment is not limited to the flowchart illustrated in FIG. 19, and, so as long as it is possible to secure sufficient capacity in the common resource 213, a flowchart of newly writing the encrypted data in the logical volume LU to be stored pursuant to the key change into the common resource 213 may also be used.

(1-8) Restoration Processing of Logical Volume LU Undergoing Key Change

Figure 20:
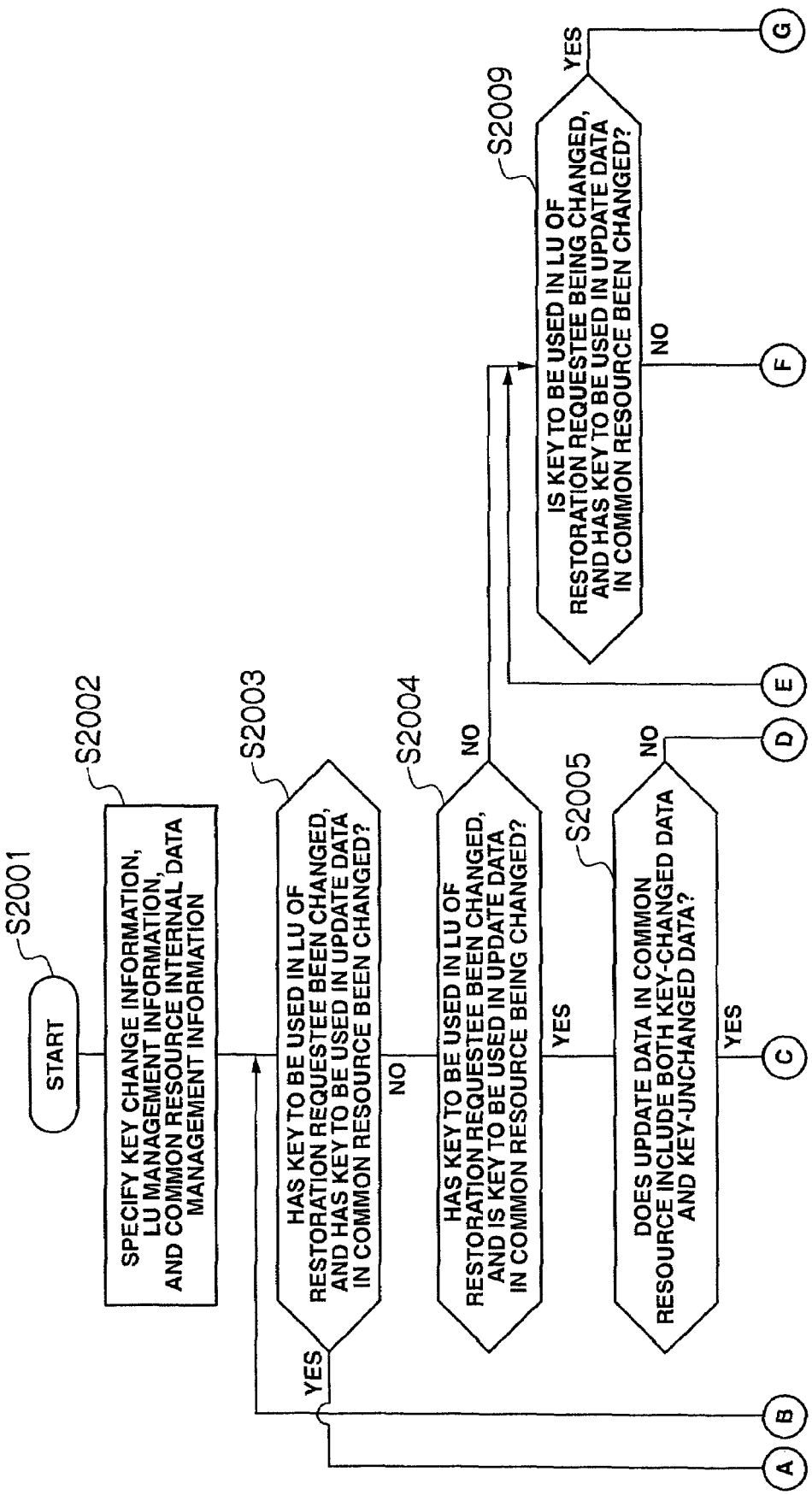
FIG. 20 is a flowchart showing restoration processing according to an embodiment of the present invention.
Figure 21:
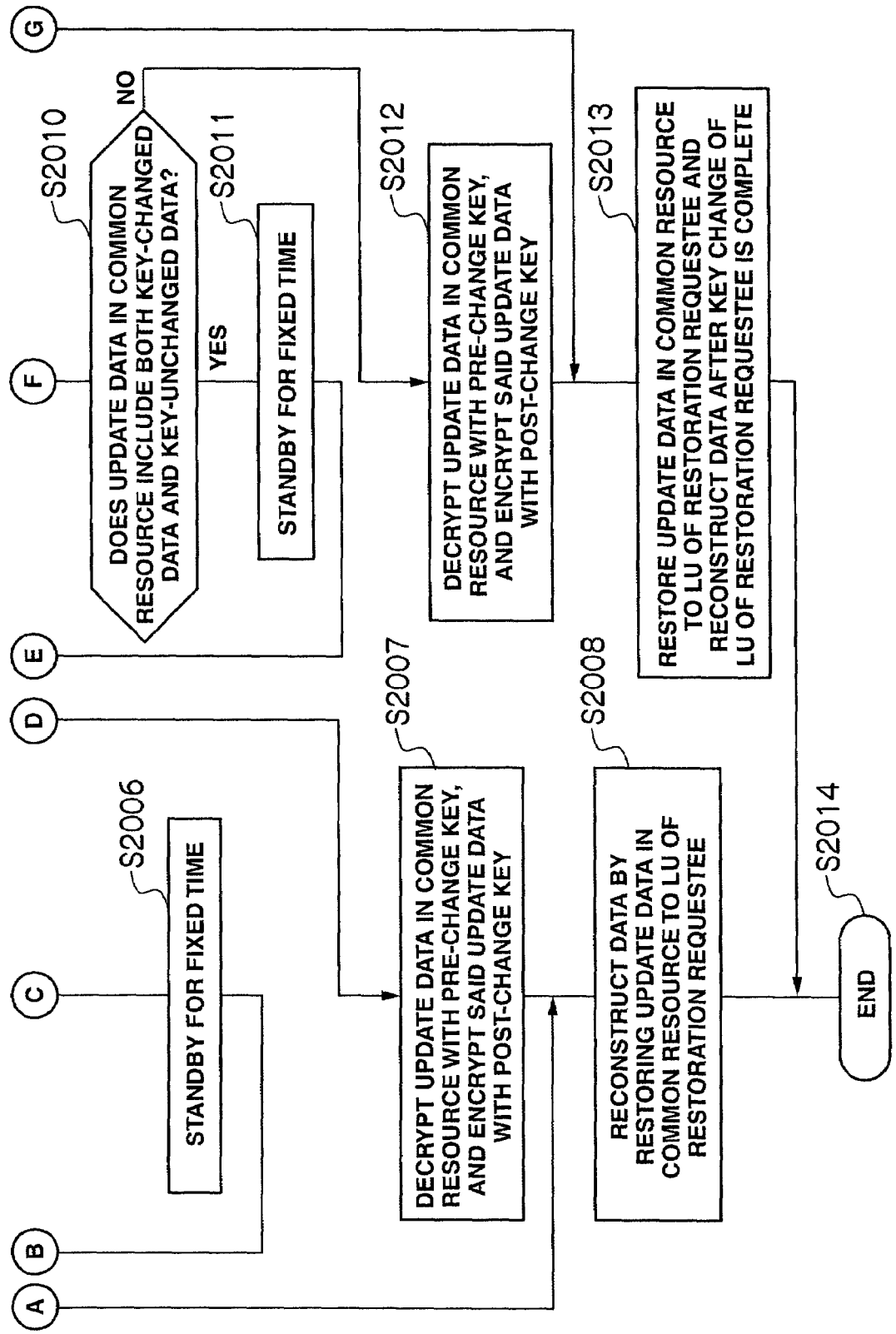
FIG. 21 is a flowchart showing restoration processing according to an embodiment of the present invention.

The flowchart for performing restoration processing in a case where the CPU 221 of the storage apparatus 201A is to reconstruct data in the logical volume LU by restoring the update data of the logical volume LU to be restored in the common resource 213 to the logical volume LU when the management computer 301 makes a restoration request to the logical volume LU during a key change of the logical volume LU using the common resource 213 is now explained. The flowchart for performing restoration processing is explained with reference to FIG. 20 and FIG. 21.

Restoration processing is executed by the CPU 221 based on the restoration control program 229 and the encryption/decryption program 227.

Incidentally, the key change processing of data itself of the logical volume LU pursuant to the key change of the logical volume LU has been explained above, and redundant explanation thereof is omitted. Further, details concerning the method of updating the common resource internal data management information 247 and the key change information 246 have been explained in the foregoing SLPR partitioning processing/SLPR connection processing, and redundant explanation thereof is omitted in this flowchart.

Foremost, when the CPU 221 of the storage apparatus 201A receives a restoration request from the management computer 301 for restoring the data in the logical volume undergoing a key change, it starts the restoration processing (S2001).

A key change is the process of changing the key to be used for the logical volume LU to be restored, and changing the key to be used for the update data in the common resource 213 corresponding to the logical volume LU to undergo a key change. Specifically, the CPU 221 updates the common resource internal data management information 247 and the key change of the logical volume LU information 246.

Subsequently, the CPU 221 specifies the key change information 248 of the logical volume LU of the restoration requestee (restoration target), the "change status" field 244G of the LU management information 244, and the "change status" field 247E of the common resource internal data management information 247 (S2002).

Based on the information acquired at step S1802, the CPU 221 determines whether the key change of the key to be used for the data in the logical volume LU of the restoration requestee is complete, and whether the key change of the key to be used for the update data in the common resource 213 corresponding to the logical volume LU of the restoration requestee is also complete (S2003).

Incidentally, a logical volume LU of the restoration requestee refers to a logical volume LU at a certain point in time. Replicated data is stored in the logical volume at a certain point in time. This kind of replicated data is periodically acquired. By overwriting the update data in the common resource 213 on the logical volume LU at a certain point in time, data of the logical volume LU at an arbitrary point in time can be reconstructed.

When the CPU 221 determines that the key change of the key to be used for the logical volume LU of the restoration requestee and for the update data in the common resource 213 corresponding to the logical volume LU is complete (S2003: YES), it reconstructs the data by restoring the update data in the common resource 213 to the logical volume LU of the restoration requestee (S2008).

Meanwhile, when the CPU 221 determines that the key change of the key to be used for the logical volume LU of the restoration requestee and for the update data in the common resource 213 corresponding to the logical volume LU is not complete (S2003: NO), it determines whether the key change of the key to be used for the logical volume LU of the restoration requestee is complete, but the key to be used for the common resource 213 corresponding to the logical volume LU is undergoing a key change (S2004).

When the CPU 221 determines that the key change of the key to be used for the logical volume LU of the restoration requestee is complete, but the key to be used for the common resource 213 corresponding to the logical volume LU is undergoing a key change (S2004: YES), it thereafter determines whether the update data includes both the changed portion and unchanged portion of the key to be used for the update data (S2005).

When the CPU 221 determines that the new data includes both the changed portion and unchanged portion of the key to be used for the update data (S2005: YES), it stands by for a fixed period (S2006), and thereafter once again returns to step S2003.

Meanwhile, when the CPU 221 determines that the update data does not include both the changed portion and unchanged portion of the key to be used for the update data (S2005: NO); that is, when the CPU 221 determines that all blocks are key-unchanged blocks, it uses a pre-change key to decrypt the update data and uses a post-change key to encrypt such data (S2007). The CPU 221 thereafter reconstructs the data by performing the processing at step S2008, and then ends the restoration processing (S2014).

When the CPU 221 determines at step S2004 that the key change of the key to be used for the logical volume LU of the restoration requestee is not complete, or the key to be used for the common resource 213 corresponding to the logical volume LU is not undergoing a key change (S2004: NO), the CPU 221 thereafter determines whether the key to be used for the logical volume LU of the restoration requestee is undergoing a key change, and whether the key change of the key to be used for the update data in the common resource 213 corresponding to the logical volume LU is complete (S2009).

When the CPU 221 determines that the key to be used for the logical volume LU of the restoration requestee is undergoing a key change, and the key change of the key to be used for the update data in the common resource 213 corresponding to the logical volume LU is complete (S2009: YES), it reconstructs data by restoring the update data in the common resource 213 to the logical volume LU of the restoration requestee after the key change of the key to be used for the logical volume LU of the restoration requestee is complete (S2013), and then ends this processing (S2014).

Meanwhile, when the CPU 221 determines that the key to be used for the logical volume LU of the restoration requestee is not undergoing a key change, and the key change of the key to be used for the update data in the common resource 213 corresponding to the logical volume LU is not complete (S2009: NO), it determines whether the update data includes both the changed portion and unchanged portion of the key to be used for the update data (S2010).

Like this, the CPU 221 performs the processing at step S2010 to S2013 according to the same routine as the processing at step S2005 to S2008, and then ends this processing (S2014).

(1-9) Effect of First Embodiment

According to the present embodiment, the storage apparatus is able to change the key to be used for the logical volume LU arising due to SLPR partitioning or SLPR connection, perform write processing of the update data stored in the common resource during a key change, and perform restoration processing using the update data in the logical volume undergoing a key change.

Further, according to this embodiment, it is possible to improve the security of the update data since the update data of the logical volume is stored in the common resource, and the key of the logical volume and the key to be used for the common resource are associated and managed.

Moreover, according to the present embodiment, the administrator will be able to properly use the update data of the logical volume LU.

(2) Second Embodiment

A computer system according to the second embodiment is now explained. FIG. 1 shows the computer system 10 according to the second embodiment. In the second embodiment, the same reference numeral is given to components that are configured the same as the first embodiment. Explanation of the second embodiment will only be regarding the configurations that are different from the first embodiment.

The difference between this embodiment and the first embodiment is that, with the storage apparatus 201A of the first embodiment, an SLPR using an old key still existed even after the SLPR partitioning or SLPR connection, and, with the storage apparatus 201B of this embodiment, the old key is discarded upon performing the SLPR partitioning or SLPR connection, and a new key is allocated to all SLPRs so as to make a change from an old key to a new key.

(2-1) SLPR Partition Processing

Figure 22:
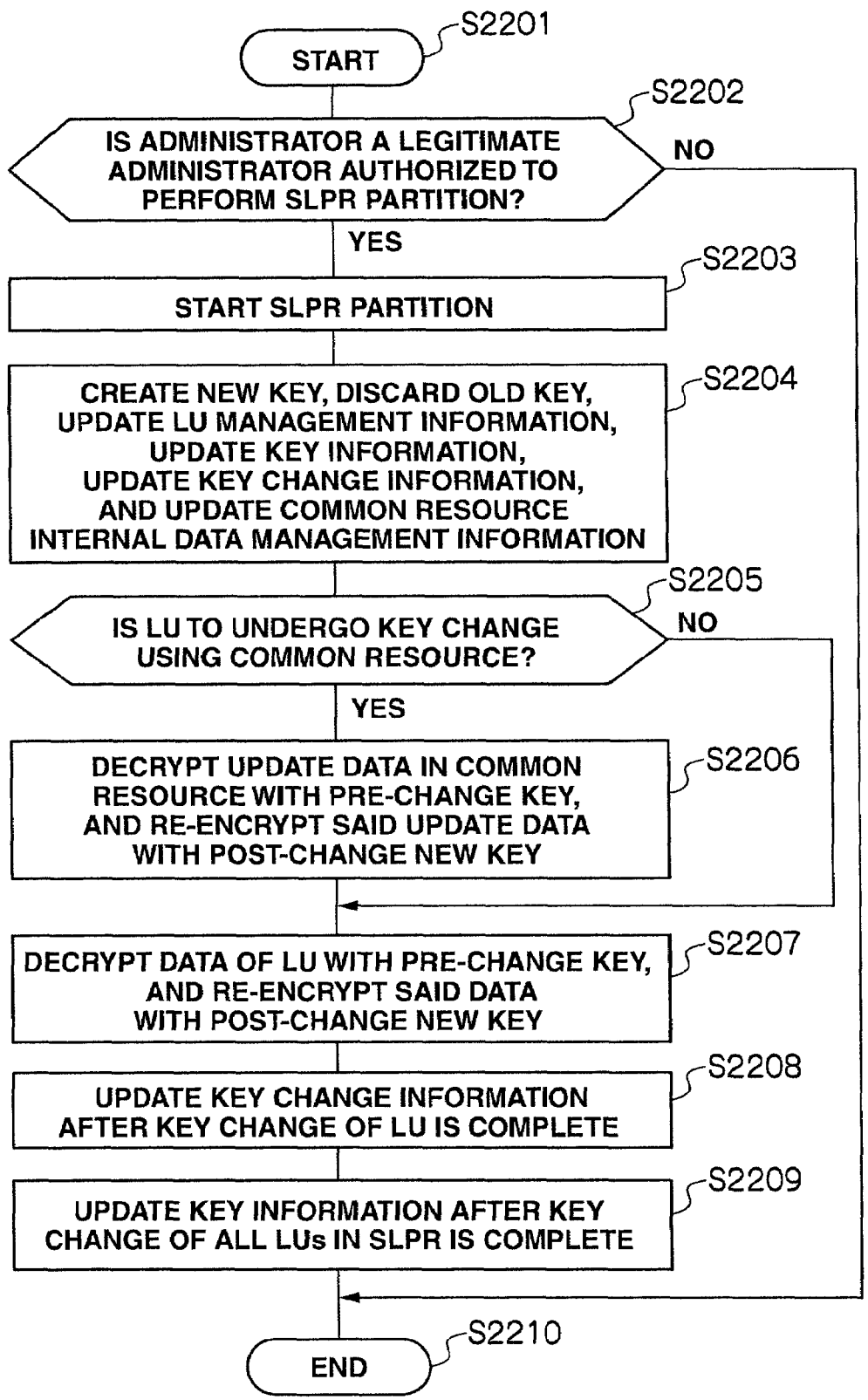
FIG. 22 is a flowchart showing SLPR partition processing according to another embodiment of the present invention.

Foremost, the SLPR partition processing according to the second embodiment is explained with reference to FIG. 22. The SLPR partition processing according to the second embodiment is executed by the CPU 221 of the storage apparatus 201B based on the storage apparatus management program 225, the key change program 226, the encryption/decryption program 227, and the account authentication/certification program 228.

Specifically, the CPU 221 performs the processing at step S2201 to S2203 based on the same routine as the processing at step S1401 to S1403.

Subsequently, the CPU 221 creates a new key for each SLPR based on the key change program 226, and performs the key change of each SLPR (S2204).

The key change is explained with reference to FIG. 23.

FIG. 23A shows the key information 245 before SLPR partitioning, and FIG. 23B shows the key information 245 after SLPR partitioning.

Here, the CPU 221 partitions the storage apparatus 201B into SLPR1 and SLPR2. Upon performing this partition processing, a new key with a key number of "2" is allocated to SLPR1 and a new key with a key number of "3" is allocated to SLPR2 for performing the key change of each SLPR. When the CPU 221 completes the key change, it discards the conventionally used key (key with a key number of "1").

The CPU 221 thereafter performs the processing at step S2205 to S2210 according to the same routine as the processing at step S1405 to S1410, and then ends this SLPR partition processing.

(2-2) SLPR Connection Processing

Figure 24:
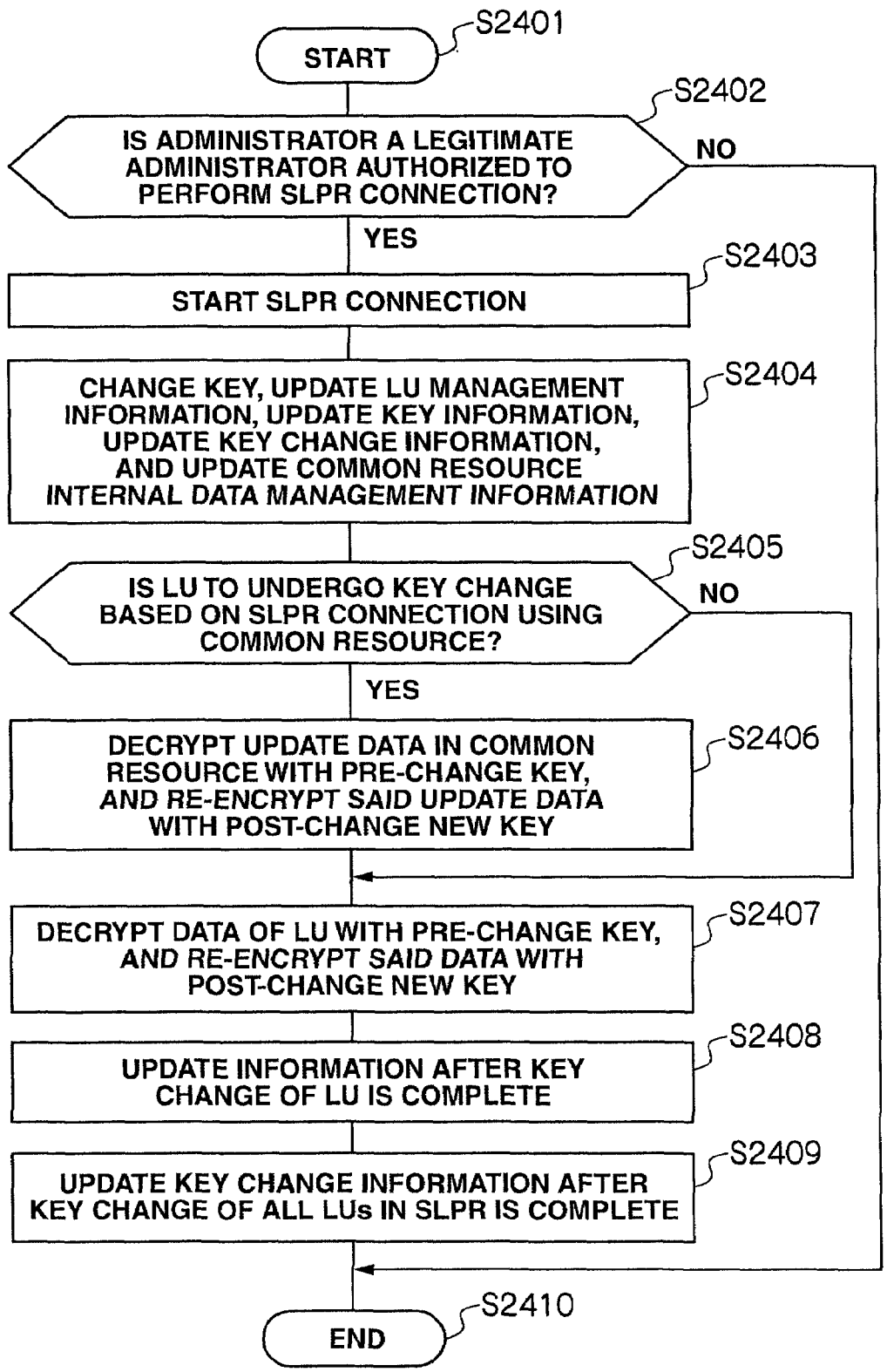
FIG. 24 is a flowchart showing SLPR connection processing according to another embodiment of the present invention.

A case of executing key change processing pursuant to the CPU 221 of the storage apparatus 201B performing SLPR connection is now explained with reference to the flowchart illustrated in FIG. 24. In FIG. 24, as with FIG. 22, the CPU 221 of the storage apparatus 201B executes such key change processing based on the storage apparatus management program 225, the key change program 226, the encryption/decryption program 227, and the account authentication/certification program 228.

Specifically, the CPU 221 performs the processing at step S2401 to S2403 according to the same routine as the processing at step S1501 to S1503.

The CPU 221 thereafter creates a new key to be used after the SLPR connection based on the key change program 226, and performs the key change of each SLPR to be connected (S2404).

The key change is explained with reference to FIG. 23.

FIG. 23A shows the key information 245 before SLPR connection, and FIG. 23B shows the key information 245 after SLPR connection.

Here, the CPU 221 connects SLPR1 and SLPR2. The connection processing of connecting SLPR1 and SLPR2 is executed by allocating a new key with a key number of "4" and performing the key change of SLPR1 and SLPR2. When the CPU 221 completes the key change, it discards the conventionally used keys (keys with the key number of "2" and "3").

The CPU 221 thereafter performs the processing at step S2405 to S2410 according to the same routine as the processing at step 1505 to S1510, and then ends this SLPR connection processing.

(2-3) Effect of Second Embodiment

According to the present embodiment, the storage apparatus is able to discard the old key that was used before partitioning or after connection pursuant to the key change of the key to be used for SLPR arising due to SLPR partitioning or SLPR connection.

Further, according to this embodiment, it is possible to improve the security of the update data since the update data of the logical volume is stored in the common resource, and the key of the logical volume and the key to be used for the common resource are associated and managed.

Moreover, according to this embodiment, the administrator will be able to properly use the update data of the logical volume LU.

(3) Third Embodiment

A computer system according to the third embodiment is now explained. FIG. 1 shows the computer system 100 according to the third embodiment. In the third embodiment, the same reference numeral is given to components that are configured the same as the first embodiment. Explanation of the third embodiment will only be on the configurations that are different from the first embodiment.

The present embodiment differs from the first embodiment in that, upon subjecting the storage apparatus 201C to SLPR partitioning, a new common resource 213B is created in a different SLPR when storing in the common resource 213A the update data of the logical volume LU to be affiliated with an SLPR that is different from the SLPR to which the common resource is affiliated, and the update data of the logical volume LU stored in the common resource 213A is migrated to the new common resource 213B.

(3-1) Logical System Configuration

The logical system configuration of this embodiment differs from the logical system configuration (FIG. 2) explained in the first embodiment.

Specifically, as shown in FIG. 25, in SLPR1 and SLPR2 resulting from logically partitioning the storage apparatus 201C, not only does SLPR1 have a common resource 213A, SLPR2 also has a common resource 213B. Since the first embodiment explained a case where either SLPR1 or SLPR2 has a common resource 213, this point differs from the present embodiment.

(3-2) SLPR Partition Processing

The difference in the processing performed by the storage apparatus 201C in this embodiment and the processing performed by the storage apparatus 201A in the first embodiment is now explained.

In the first embodiment, at step S1405 to S1407 of FIG. 14, a case was explained where the update data in the common resource of the logical volume LU to undergo a key change pursuant to SLPR partitioning was re-encrypted with a new key of the logical volume LU to be allocated during the SLPR partitioning.

Contrarily, in the present embodiment, when update data of the logical volume LU affiliated with an SLPR that is different from the SLPR to which the common resource is affiliated is created in the common resource upon SLPR partitioning, a new common resource is created for the different SLPR, and the update data of the logical volume LU affiliated with such different SLPR in the common resource is re-encrypted with the new key of the logical volume LU to be allocated during SLPR partitioning and migrated to the new common resource.

Figure 26:
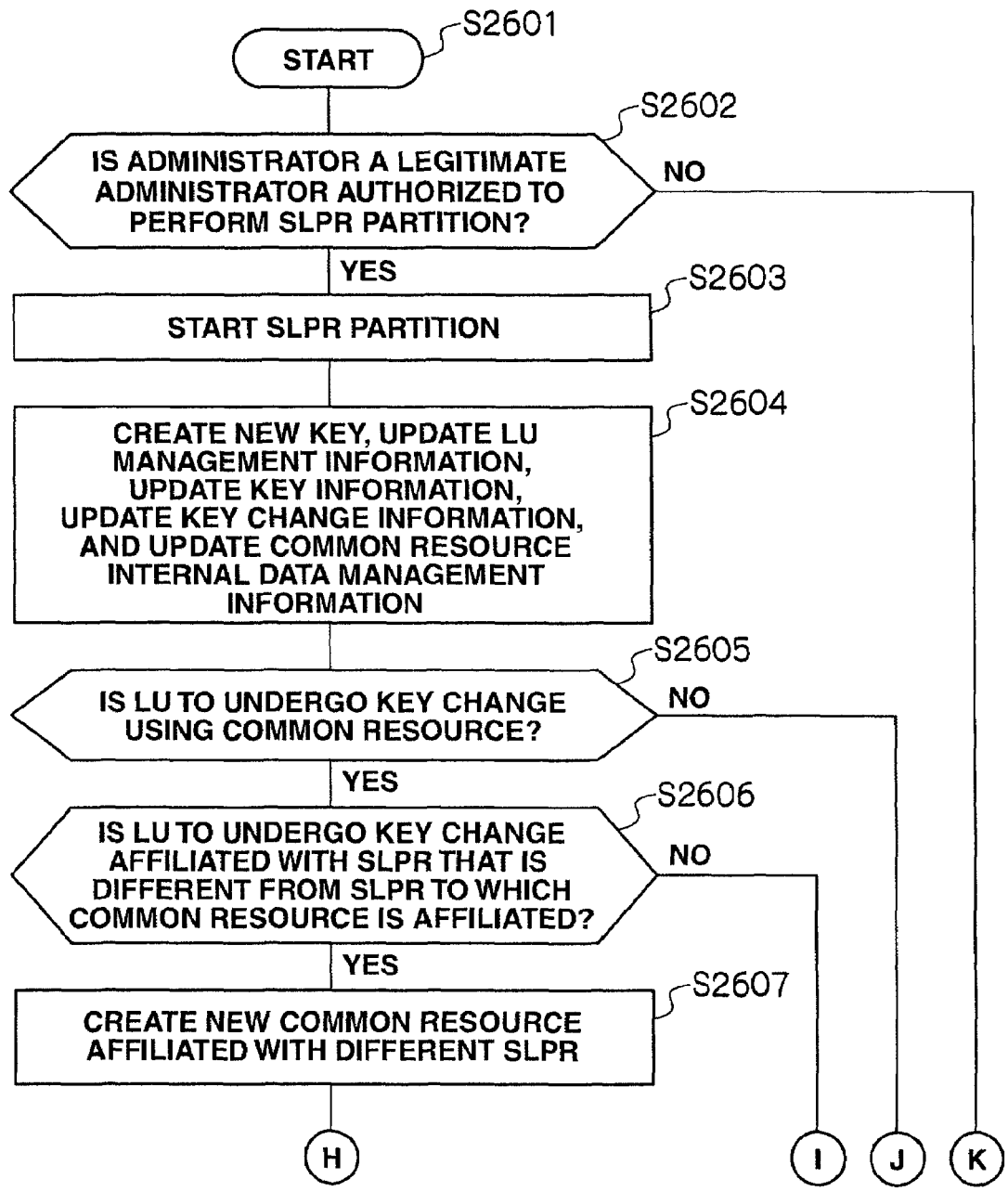
FIG. 26 is a flowchart showing SLPR partition processing according to another embodiment of the present invention.
Figure 27:
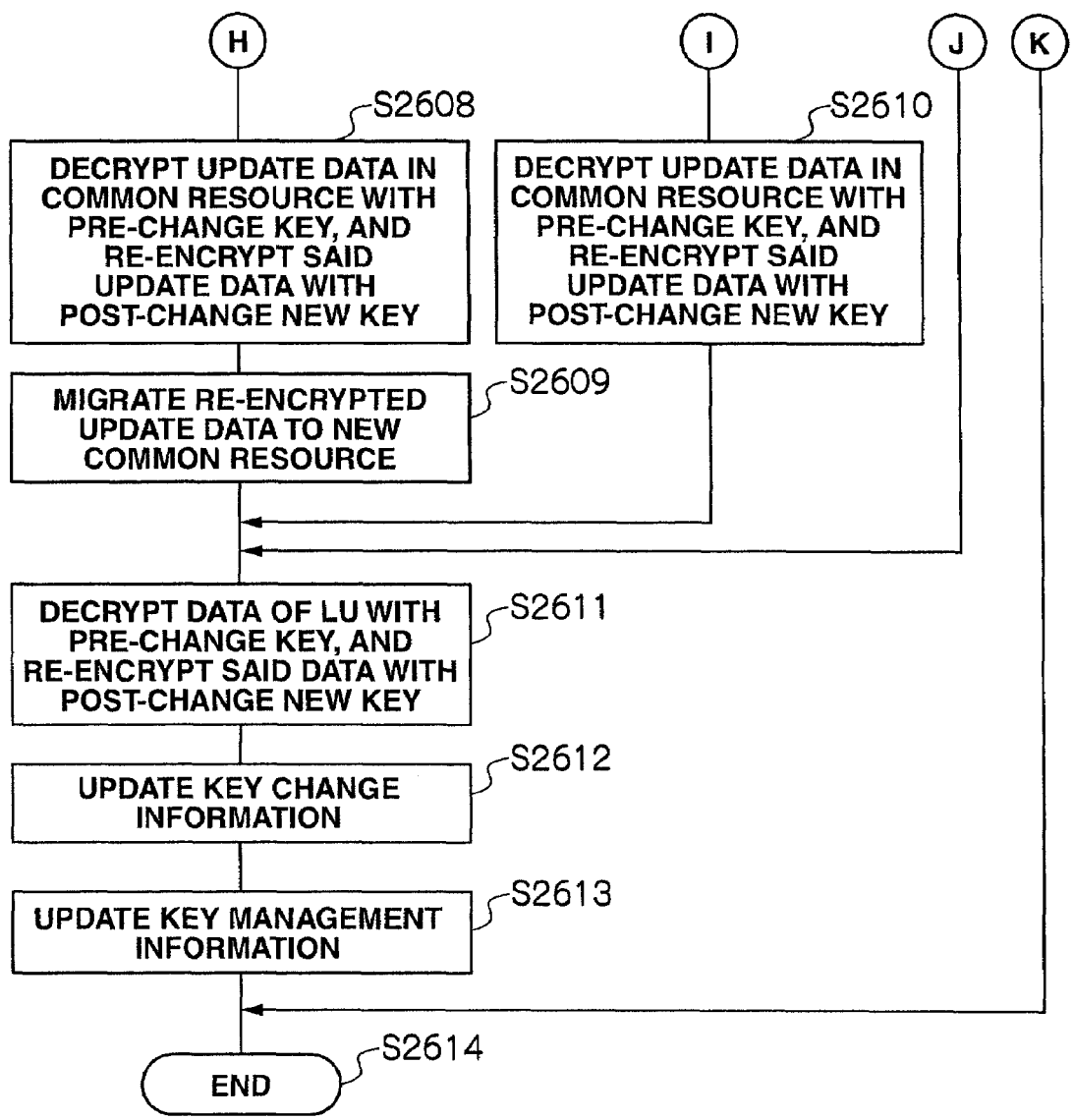
FIG. 27 is a flowchart showing SLPR partition processing according to another embodiment of the present invention.

Specifically, the SLPR partition processing according to the third embodiment is explained with reference to FIG. 26 and FIG. 27. The SLPR partition processing according to the third embodiment is executed by the CPU 221 of the storage apparatus 201B based on the storage apparatus management program 225, the key change program 226, the encryption/decryption program 227, and the account authentication/certification program 228.

Foremost, the CPU 221 performs processing at step S2601 to S2605 according to the same routine as the processing at step S1401 to S1405.

When the CPU 221 determines that the logical volume LU to undergo a key change is using the common resource (S2605: YES), it determines whether a logical volume LU among the logical volumes LU to undergo a key change is affiliated with an SLPR that is different from the SLPR to which the common resource 213 is affiliated (S2606).

For example, as shown in FIG. 25, the CPU 221 determines whether there is a logical volume LU among the logical volumes LU to undergo a key change that is affiliated with SLPR2, which is an SLPR that is different from SLPR1 to which the common resource 213A is affiliated.

When the CPU 221 determines that a logical volume LU among the logical volumes LU to undergo a key change is affiliated with an SLPR that is different from the SLPR to which the common resource 213 is affiliated (S2606: YES), it creates a new common resource affiliated with the different SLPR(S2607).

For instance, as shown in FIG. 25, the CPU 221 creates a new common resource 213B affiliated with SLPR2.

The CPU 221 uses a pre-change key to decrypt the update data in the common resource affiliated with the SLPR and uses a post-change key to re-encrypt such update data (S2608).

The CPU 221 thereafter migrates the re-encrypted update data to the new common resource, and stores it therein (S2609).

A specific example of the foregoing processing is explained with reference to FIG. 28A to FIG. 28C.

FIG. 28A shows common resource internal data management information before SLPR partitioning. FIG. 28B shows common resource internal data management information during SLPR partitioning. FIG. 28C shows common resource internal data management information after SLPR partitioning.

Foremost, FIG. 28A shows that the logical volumes LU1, LU3 are using the common resource 1 before SLPR partitioning. Thereafter, by performing SLPR partition processing based on FIG. 28B, the common resource 213 of "1" and the logical volume LU1 are affiliated with SLPR1, and the logical volume LU3 is affiliated with SLPR2. Here, the logical volume LU3 is affiliated with SLPR2, which is different from SLPR1 to which the common resource 213 of "1" is affiliated.

Thus, the CPU 221 executes the processing at step S2607 to S2609. As specific processing, as shown in FIG. 25, a new common resource 213B is created, the update data of the logical volume LU3 stored in the common resource 213A is decrypted using a key that was used before SLPR partitioning, and such update data is re-encrypted using a key that was newly allocated after SLPR partitioning and migrated to the common resource 213B. After the migration processing is complete, the common resource internal data management information 247 will become the status illustrated in FIG. 28C.

Meanwhile, when the CPU 211 determines at step S2606 that there is no logical volume LU among the logical volumes LU to undergo a key change that is affiliated with an SLPR that is different from the SLPR to which the common resource 213 is affiliated (S2606: NO), it thereafter performs the processing at step S2610 to S2614 according to the same routine as the processing at step S1406 to S1410, and then ends the SLPR partition processing.

Incidentally, in this embodiment, after the update data of the logical volume LU is re-encrypted and the re-encrypted update data is migrated to the new common resource, the migrated update data is not stored in the common resource of the migration source. Nevertheless, the migrated update data may be stored in the common resource of the migration source even after migration.

Incidentally, the SLPR connection processing of this embodiment differs in that the processing that is the same as the processing to be performed to the common resource in the first embodiment is also performed to the new common resource. Nevertheless, the SLPR connection processing is not explained here since it is the same as the processing to be performed to the common resource 213 explained in the first embodiment.

(3-3) Effect of Third Embodiment

According to the present embodiment, the storage apparatus is able to migrate the update data of a logical volume affiliated with a different SLPR due to SLPR partitioning to a common resource that is newly created in the different SLPR.

Further, according to this embodiment, it is possible to improve the security of the update data since the update data of the logical volume is stored in the common resource, and the key of the logical volume and the key to be used for the common resource are associated and managed.

Moreover, according to this embodiment, the administrator will be able to properly use the update data of the logical volume LU.

(4) Other Embodiments

Although the first to third embodiments were described above, the present invention is not in any way limited to the foregoing embodiments, and may be practiced in various modes within a range that does not deviate from the gist of this invention as a matter of course.

Although the storage apparatus of the present invention was configured to store an encryption/decryption unit for encrypting or decrypting data stored in the logical volume LU or update data stored in the common resource 213, and a key change unit for changing a key for encrypting or decrypting data stored in the logical volume LU, and changing a key for encrypting or decrypting update data stored in the common resource 213 based on information of the key used for data stored in the logical volume LU in the memory 223, the encryption/decryption unit and the key change unit may be adopt an independent hardware configuration.

Further, although the management unit for managing the association information of the logical volume LU, the common resource 213 and the management area SLPR was stored in the memory 223, the management unit may adopt an independent hardware configuration.

The present invention can be broadly applied to a storage apparatus comprising one or more disk devices with an encryption/decryption function, as well as to various other storage apparatuses.

What is claimed is:

1. A storage apparatus connected to a computer, comprising:
    (a) a plurality of storage devices for configuring a storage area;
    (b) a controller for controlling data read/write from/in the storage devices,
        wherein the storage area includes a first logical partition and a second logical partition, the first logical partition includes a first logical volume and the second logical partition includes a second logical volume, and the first logical partition includes a common resource that includes a first area in which pre-update data of the first logical volume is stored and a second area in which pre-update data of the second logical volume is stored;
    (c) an encryption/decryption unit for encrypting or decrypting data stored in said logical volumes or update data stored in said common resource; and
    (d) a key change unit for changing a key for encrypting or decrypting data stored in said logical volumes, and changing a key for encrypting or decrypting update data stored in said common resource based on information of said key used for data stored in said logical volumes,
    wherein a first encryption key is set to the first partition, and a second encryption key is set to the second partition;
    wherein the encryption key for the second area is changed from the first encryption key to the second encryption key, and
    wherein the pre-update data stored in the second area is decoded using the first encryption key and then encrypted using the second encryption key.

2. The storage apparatus according to claim 1, further comprising a management unit for managing association information of said logical volumes, said common resource and said management area;
    wherein said management unit manages change information of a key for encrypting or decrypting data stored in said logical volumes or manages change information of a key for encrypting or decrypting update data stored in said common resource.

3. The storage apparatus according to claim 1,
    wherein, when said key change unit receives a read/write request from said computer, said key change unit determines whether a key for encrypting or decrypting data stored in said logical volumes has been changed, and
    when said key change unit determines that the key has been changed, said key change unit stores data stored in said logical volumes as update data in said common resource without encrypting or decrypting said data.

4. The storage apparatus according to claim 1,
    wherein, when said key change unit receives a read/write request from said computer, said key change unit determines whether a key for encrypting or decrypting data stored in said logical volumes is being changed, and
    when said key change unit determines that the key is being changed, said key change unit determines whether there is a key-changed block and an key-unchanged block based on the blocks in said logical volumes storing data or the blocks in said common resource storing update data, and
    when said key change unit determines that said blocks include said key-changed block and said key-unchanged block, said key change unit stands by until the key change of all blocks is complete, and
    when said key change unit determines that all blocks are said key-unchanged blocks, said key change unit decrypts or encrypts update data stored in said common resource using a pre-change key that was used in encrypting or decrypting data stored in said logical volume, and re-encrypts or re-decrypts update data stored in said common resource using a post-change key.

5. The storage apparatus according to claim 1,
    wherein, when said key change unit receives a restoration request from a management computer managing said storage apparatus or said computer, said key change unit determines whether a key for encrypting or decrypting data stored in said logical volumes or update data stored in said common resource is being changed, and
    when said key change unit determines that the key change is complete, said key change unit reconstructs data by restoring update data stored in said common resource to said logical volumes of said restoration requestee.

6. The storage apparatus according to claim 1,
    wherein, when said key change unit receives a restoration request from a management computer managing said storage apparatus or said computer, said key change unit determines whether a key for encrypting or decrypting data stored in said logical volumes or update data stored in said common resource is being changed, and
    when said key change unit determines that the key is being changed, said key change unit determines whether there is a key-changed block and an key-unchanged block based on the blocks in said logical volumes storing data or the blocks in said common resource storing update data, and when said key change unit determines that said blocks include said key-changed block and said key-unchanged block, said key change unit stands by until the key change of all blocks is complete, and when said key change unit determines that all blocks are said key-unchanged blocks, said key change unit decrypts or encrypts update data stored in said common resource using a pre-change key that was used in encrypting or decrypting data stored in said logical volumes, and re-encrypts or re-decrypts update data stored in said common resource using a post-change key, and said key change unit reconstructs data by restoring update data stored in said common resource to said logical volumes of said restoration requestee.

7. The storage apparatus according to claim 1, wherein a new key to be used for encrypting or decrypting data stored in said logical volumes is created for each of said management areas when said allocation processing is performed, and wherein the old key that was used before performing said allocation processing for encrypting or decrypting data stored in said logical volumes or update data stored in said common resource is discarded.

8. The storage apparatus according to claim 1, wherein said common resource is created for each of said management areas, and wherein said key change unit changes a key for encrypting or decrypting data stored in said logical volume affiliated with one management area so that said logical volume will be affiliated with another management area, and stores update data stored in said common resource affiliated with one management area into a common resource newly created in another management area.

9. The storage apparatus according to claim 1, wherein said partitions are combined.

10. A data management method of a storage apparatus connected to a computer, wherein said storage apparatus comprises (a) a plurality of storage devices for configuring a storage area, and (b) a controller for controlling data read/write from/in the storage devices, wherein the storage area includes a first logical partition and a second logical partition, the first logical partition includes a first logical volume and the second logical partition includes a second logical volume, and the first logical partition includes a common resource that includes a first area in which pre-update data of the first logical volume is stored and a second area in which pre-update data of the second logical volume is stored; said method comprising:

for storing data from said computer in said storage resources;

storing data pre-stored in said logical volumes as update data in order to store subsequent data from said computer in said logical volumes;

assigning a first encryption key to the first partition;

assigning a second encryption key to the second partition;

encrypting or decrypting data stored in said logical volumes or update data stored in said common resource;

a key change step for changing a key for encrypting or decrypting data stored in said logical volumes, and changing a key for encrypting or decrypting update data stored in said common resource based on information of said key used for data stored in said logical volumes, wherein said key changing step includes changing the encryption key for the second area from the first encryption key to the second encryption key; and decoding the pre-update data stored in the second area using the first encryption key and then encrypting using the second encryption key.

11. The data management method according to claim 10, wherein at least one or more said logical volumes or said common resources are provided to said storage apparatus; and wherein said key change step is executed when allocation processing of allocating at least one or more logical volumes or common resources to one or more management areas formed for managing said storage apparatus is performed.

12. The data management method according to claim 11, further comprising a management step for managing association information of said logical volumes, said common resource and said management area;

wherein, at said management step, change information of a key for encrypting or decrypting data stored in said logical volume is managed or change information of a key for encrypting or decrypting update data stored in said common resource is managed.

13. The data management method according to claim 11, wherein, at said key change step, when a read/write request is received from said computer, whether a key for encrypting or decrypting data stored in said logical volumes has been changed is determined, and when it is determined that the key has been changed, data stored in said logical volumes is stored as update data in said common resource without encrypting or decrypting said data.

14. The data management method according to claim 11, wherein, at said key change step, when a read/write request is received from said computer, whether a key for encrypting or decrypting data stored in said logical volumes is being changed is determined, and when it is determined that the key is being changed, whether there is a key-changed block and an key-unchanged block is determined based on the blocks in said logical volumes storing data or the blocks in said common resource storing update data, and when it is determined that said blocks include said key-changed block and said key-unchanged block, the process stands by until the key change of all blocks is complete, and when it is determined that all blocks are said key-unchanged blocks, update data stored in said common resource is decrypted or encrypted using a pre-change key that was used in encrypting or decrypting data stored in said logical volume, and update data stored in said common resource is re-decrypted or re-encrypted using a post-change key.

15. The data management method according to claim 11, wherein, at said key change step, when a restoration request is received from a management computer managing said storage apparatus or said computer, whether a key for encrypting or decrypting data stored in said logical volumes or update data stored in said common resource is being changed is determined, and when it is determined that the key change is complete, data is reconstructed by restoring update data stored in said common resource to said logical volume of said restoration requestee.

16. The data management method according to claim 11, wherein, at said key change step, when a restoration request is received from a management computer managing said storage apparatus or said computer, whether a key for encrypting or decrypting data stored in said logical volumes or update data stored in said common resource is being changed is determined, and when it is determined that the key is being changed, whether there is a key-changed block and an key-unchanged block is determined based on the blocks in said logical volumes storing data or the blocks in said common resource storing update data, and when it is determined that said blocks include said key-changed block and said key-unchanged block, the process stands by until the key change of all blocks is complete, and when it is determined that all blocks are said key-unchanged blocks, update data stored in said common resource is decrypted or encrypted using a pre-change key that was used in encrypting or decrypting data stored in said logical volumes, and update data stored in said common resource is re-encrypted or re-decrypted using a post-change key, and data is reconstructed by restoring update data stored in said common resource to said logical volume of said restoration requestee.

17. The data management method according to claim 11, wherein a new key to be used for encrypting or decrypting data stored in said logical volumes is created for each of said management areas when said allocation processing is performed, and wherein the old key that was used before performing said allocation processing for encrypting or decrypting data stored in said logical volumes or update data stored in said common resource is discarded.

18. The data management method according to claim 11, wherein said common resource is created for each of said management areas, and wherein a key for encrypting or decrypting data stored in said logical volume affiliated with one management area is changed so that said logical volume will be affiliated with another management area, and update data stored in said common resource affiliated with one management area is stored into a common resource newly created in another management area.

19. The storage method according to claim 10, further comprising combining said partitions.

20. A storage apparatus connected to a computer, comprising:

a logical volume for storing data from said computer;

a common resource for storing data pre-stored in said logical volume as update data in order to store subsequent data from said computer in said logical volume;

an encryption/decryption unit for encrypting or decrypting data stored in said logical volume or update data stored in said common resource; and a key change unit for changing a key for encrypting or decrypting data stored in said logical volume, and changing a key for encrypting or decrypting update data stored in said common resource based on information of said key used for data stored in said logical volume, wherein at least one or more said logical volumes or said common resources are provided;

wherein said key change unit is executed when allocation processing of allocating at least one or more logical volumes or common resources to one or more management areas formed for managing said storage apparatus is performed;

wherein, when said key change unit receives a read/write request from said computer, it determines whether a key for encrypting or decrypting data stored in said logical volume is being changed, and when said key change unit determines that the key is being changed, it determines whether there is a key-changed block and an key-unchanged block based on the blocks in said logical volume storing data or the blocks in said common resource storing update data, and when said key change unit determines that said blocks include said key-changed block and said key-unchanged block, it stands by until the key change of all blocks is complete, and when said key change unit determines that all blocks are said key-unchanged blocks, it decrypts or encrypts update data stored in said common resource using a pre-change key that was used in encrypting or decrypting data stored in said logical volume, and re-encrypts or re-decrypts update data stored in said common resource using a post-change key.

21. A storage apparatus connected to a computer, comprising:

a logical volume for storing data from said computer;

a common resource for storing data pre-stored in said logical volume as update data in order to store subsequent data from said computer in said logical volume;

an encryption/decryption unit for encrypting or decrypting data stored in said logical volume or update data stored in said common resource; and a key change unit for changing a key for encrypting or decrypting data stored in said logical volume, and changing a key for encrypting or decrypting update data stored in said common resource based on information of said key used for data stored in said logical volume, wherein at least one or more said logical volumes or said common resources are provided;

wherein said key change unit is executed when allocation processing of allocating at least one or more logical volumes or common resources to one or more management areas formed for managing said storage apparatus is performed; and wherein, when said key change unit receives a restoration request from a management computer managing said storage apparatus or said computer, it determines whether a key for encrypting or decrypting data stored in said logical volume or update data stored in said common resource is being changed, and when said key change unit determines that the key is being changed, it determines whether there is a key-changed block and an key-unchanged block based on the blocks in said logical volume storing data or the blocks in said common resource storing update data, and when said key change unit determines that said blocks include said key-changed block and said key-unchanged block, it stands by until the key change of all blocks is complete, and when said key change unit determines that all blocks are said key-unchanged blocks, it decrypts or encrypts update data stored in said common resource using a pre-change key that was used in encrypting or decrypting data stored in said logical volume, and re-encrypts or re-decrypts update data stored in said common resource using a post-change key, and said key change unit reconstructs data by restoring update data stored in said common resource to said logical volume of said restoration requestee.

22. A data management method of a storage apparatus connected to a computer, comprising:

an encryption/decryption step for storing data from said computer;

storing data pre-stored in said logical volume as update data in order to store subsequent data from said computer in said logical volume; and encrypting or decrypting data stored in said logical volume or update data stored in said common resource; and a key change step for changing a key for encrypting or decrypting data stored in said logical volume, and changing a key for encrypting or decrypting update data stored in said common resource based on information of said key used for data stored in said logical volume, wherein at least one or more said logical volumes or said common resources are provided to said storage apparatus;

wherein said key change step is executed when allocation processing of allocating at least one or more logical volumes or common resources to one or more management areas formed for managing said storage apparatus is performed; and wherein, at said key change step, when a read/write request is received from said computer, whether a key for encrypting or decrypting data stored in said logical volume is being changed is determined, and when it is determined that the key is being changed, whether there is a key-changed block and an key-unchanged block is determined based on the blocks in said logical volume storing data or the blocks in said common resource storing update data, and when it is determined that said blocks include said key-changed block and said key-unchanged block, the process stands by until the key change of all blocks is complete, and when it is determined that all blocks are said key-unchanged blocks, update data stored in said common resource is decrypted or encrypted using a pre-change key that was used in encrypting or decrypting data stored in said logical volume, and update data stored in said common resource is re-decrypted or re-encrypted using a post-change key.

23. A data management method of a storage apparatus connected to a computer, comprising:

an encryption/decryption step for storing data from said computer;

storing data pre-stored in said logical volume as update data in order to store subsequent data from said computer in said logical volume; and encrypting or decrypting data stored in said logical volume or update data stored in said common resource; and a key change step for changing a key for encrypting or decrypting data stored in said logical volume, and changing a key for encrypting or decrypting update data stored in said common resource based on information of said key used for data stored in said logical volume, wherein at least one or more said logical volumes or said common resources are provided to said storage apparatus;

wherein said key change step is executed when allocation processing of allocating at least one or more logical volumes or common resources to one or more management areas formed for managing said storage apparatus is performed; and wherein, at said key change step, when a restoration request is received from a management computer managing said storage apparatus or said computer, whether a key for encrypting or decrypting data stored in said logical volume or update data stored in said common resource is being changed is determined, and when it is determined that the key is being changed, whether there is a key-changed block and an key-unchanged block is determined based on the blocks in said logical volume storing data or the blocks in said common resource storing update data, and when it is determined that said blocks include said key-changed block and said key-unchanged block, the process stands by until the key change of all blocks is complete, and when it is determined that all blocks are said key-unchanged blocks, update data stored in said common resource is decrypted or encrypted using a pre-change key that was used in encrypting or decrypting data stored in said logical volume, and update data stored in said common resource is re-encrypted or re-decrypted using a post-change key, and data is reconstructed by restoring update data stored in said common resource to said logical volume of said restoration requestee.

\* \* \* \* \*